US006555252B2

(12) United States Patent
Sellmyer et al.

(10) Patent No.: US 6,555,252 B2
(45) Date of Patent: Apr. 29, 2003

(54) EXTREMELY HIGH DENSITY MAGNETIC RECORDING MEDIA, WITH PRODUCTION METHODOLOGY CONTROLLED LONGITUDINAL/PERPENDICULAR ORIENTATION, GRAIN SIZE AND COERCIVITY

(75) Inventors: David J. Sellmyer, Lincoln, NE (US); Chunping Luo, Milpitas, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 123 days.

(21) Appl. No.: 09/803,769

(22) Filed: Mar. 12, 2001

(65) Prior Publication Data

US 2001/0036562 A1 Nov. 1, 2001

Related U.S. Application Data

(60) Provisional application No. 60/190,482, filed on Mar. 18, 2000.

(51) Int. Cl.[7] .......................... B32B 15/04; B32B 15/18; B32B 15/00
(52) U.S. Cl. ....................... 428/668; 428/212; 428/332; 428/336; 428/457; 428/469; 428/472; 428/670; 428/692; 428/694 T; 428/694 TS; 428/694 TM
(58) Field of Search .......................... 428/457, 694 T, 428/694 TM, 694 TS, 332, 336, 692, 469, 471, 472, 212, 668, 670

(56) References Cited

U.S. PATENT DOCUMENTS

| | | | |
|---|---|---|---|
| 5,363,794 A | 11/1994 | Lairson et al. | 117/7 |
| 5,514,452 A | * 5/1996 | Araki et al. | 428/213 |
| 5,603,766 A | 2/1997 | Visokay et al. | 117/105 |
| 5,759,681 A | 6/1998 | Hosoe et al. | |
| 5,824,409 A | * 10/1998 | Sellmyer et al. | 428/332 |
| 6,183,606 B1 | 2/2001 | Kuo et al. | 204/192.15 |

OTHER PUBLICATIONS

"The Feasibility of Magnetic Recording at 1 Terabit Per Square Inch", Wood, IEEE Transactions of Magnetics, vol. 36, No. 1, (Jan. 2000).
"Dynamics of Strong and Fragile Glass Formers: Differences and Correlation with Low–Temperature Properties", Sokolov et al., Phys. Rev. Lett, vol. 71, No. 13, p. 2062, (1993).
"Direct Formation of Ordered CoPt and FePt Compound Thin Films by Sputtering", Visokay & Sinclair, App. Phys. Lett., 66, (1995).
"Enhanced Magneto–Optical Keer Effect in Spontaneously Ordered FePt Alloys: Quantitative Agreement Between Theory and Experiment", Cebollada et al., Phys. Rev. B, 50 (1994).
"Control of the Axis of Chemical Ordering and Magnetic Anisotropy in Epitaxial FePt Films", Farrow et al., J. App. Phys. 79 (1996).
"Structural and Magnetic Properties of Nanocomposite Co:C Films", Yu, Liu & Sellmyer, J. App. Phys. vol. 85, No. 8, (Apr. 15, 1999).
"Nanocomposite CoPt:C Films For Extremely High–Density Recording", Yu, Liu, Weller & Sellmyer, App. Phys. Lett., vol. 75, No. 25, (Dec. 20, 1999).
"Magnetic Viscosity and Switching Volumes of Annealed Fe/Pt Multilayers", Luo, Shan & Sellmyer, J. App. Phys. 79(8), (Apr. 15, 1996).
"Magnetic Properties and Structure of Fe/Pt Thin Films", Luo & Sellmyer, IEEE Transactions on Magnetics, vol. 31, No. 6, (Nov. 1995).
"Structural and Magnetic Properties of FePt:$SiO_2$ Granular Thin Films", Luo & Sellmyer, App. Phys. Lett., vol. 75, No. 20, (Nov. 15, 1999).
"Use of Rotational Transverse Magnetometry to Measure Anisotropic Energy", Li, J. App. Phys. V. 85, No. 8 p. 5142, (1999).
"Nano–structured Magnetic Films For Extremely High Density Recording", Sellmyer, Yu & Kirby, Nanostructured Mat., vol. 12, (1999).
"Nanoscale Design of Films for Extremely High Density Magentic Recording", Phys. Low–Dim. Struct., 1/2 (1998) Sellmyer et al.

* cited by examiner

Primary Examiner—Stevan A. Resan
Assistant Examiner—Nikolas J. Uhlir
(74) Attorney, Agent, or Firm—James D. Welch

(57) ABSTRACT

Disclosed is a modulated grain-composition magnetic recording material with up to terabit areal density recording capacity which, preferably, is produced by sequential vacuum deposition and subsequent annealing procedures that allow selective fabrication of magnetic material with desired grain size and coercivity, and with desired longitudinal or perpendicular magnetic particle "c-axis" orientation. The preferred magnetic recording material has multiple layers of FePt/$B_2O_3$ and/or Fe/Pt/$B_2O_3$, with minimum grain size of approximately ten (10) nanometers, with perpendicularly oriented "c-axis", and with coercivity (Hc) of up to twelve (12) K-Oe. The preferred fabrication procedure involves sequential sputter deposition of FePt and $B_2O_3$ layers, followed by an anneal step.

20 Claims, 15 Drawing Sheets

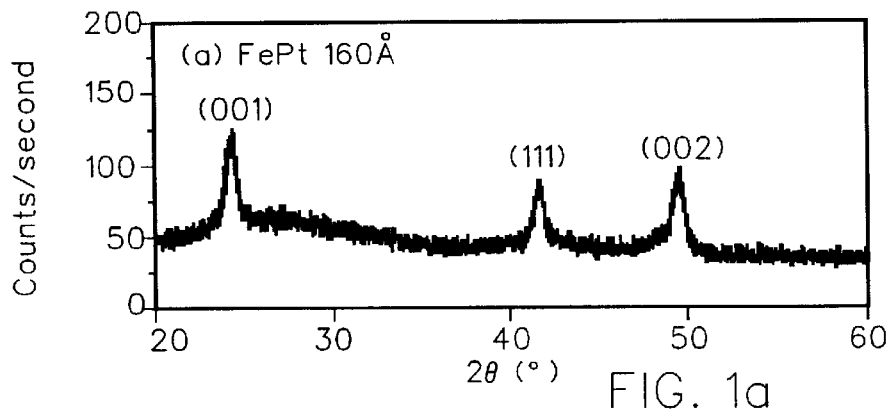
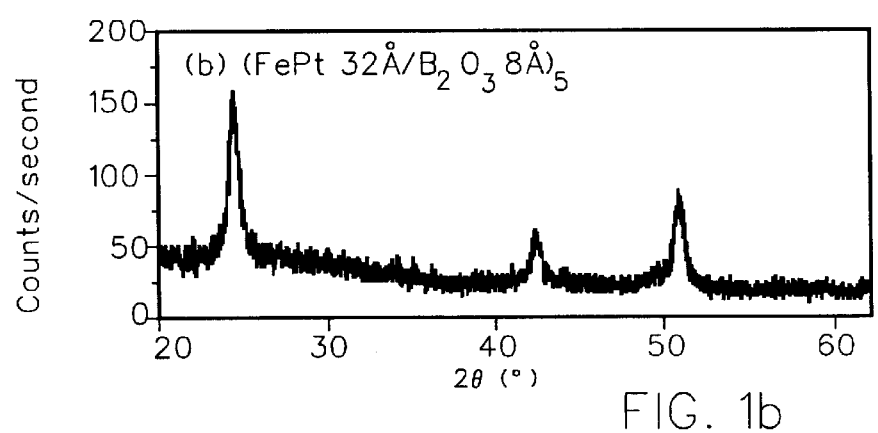
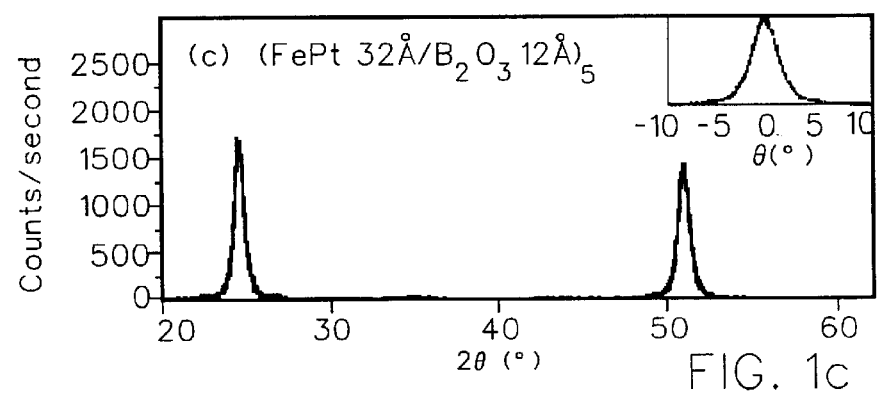
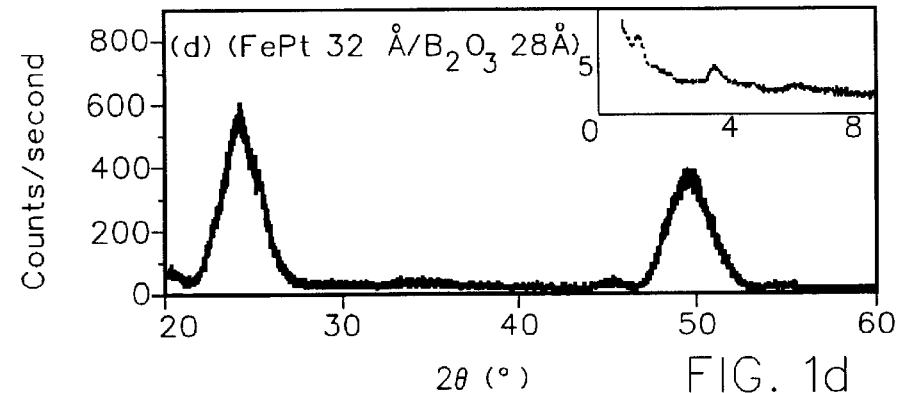
FIG. 1a
FIG. 1b
FIG. 1c
FIG. 1d

EXTREMELY HIGH DENSITY MAGNETIC RECORDING MEDIA, WITH PRODUCTION METHODOLOGY CONTROLLED LONGITUDINAL/PERPENDICULAR ORIENTATION, GRAIN SIZE AND COERCIVITY

This Application is a CIP of Provisional Application Serial No. 60/190,482 filed Mar. 18, 2000;

TECHNICAL FIELD

The present invention relates to magnetic recording media, and more particularly is a modulated grain-composition magnetic media system with up to terabit areal density recording capacity which, in preferred practice is produced by sequential multiple layer vacuum deposition, and subsequent annealing, procedures that allow selective fabrication of magnetic recording materials with intended grain size and coercivity, with longitudinal or perpendicular magnetic particle "c-axis" orientation.

BACKGROUND

As reported in an article by Wood, titled "The Feasibility of Magnetic Recording at 1 Terabit Per Square Inch", IEEE Transactions of Magnetics, Vol. 36, No. 1, (January 2000), areal density, (ie. bits per square inch), in magnetic recording products has grown at a rate approaching 100% per annum, (with practical systems now operating at an areal density of $10^{10}$ bits per square inch). Said article, which is incorporated by reference hereinto, also projects that in view of ultimate practical limitations in realizable magnetic read-write system heads, an ultimate-utility providing magnetic recording material can be described as one which presents with a maximum Coercivity (Hc) of approximately twelve Kilo-Oersteds (12K-Oe) based on perpendicularly oriented magnetic particles which have an associated minimum grain size diameter of just under ten (10 nm) nanometers, (ie. minimum stable grain size volume of six-hundred (600) cubic nanometers). Said paper further makes clear that while magnetic media with smaller grain size and larger Coercivities (Hc) are very achievable, thermal stability and practical ultimate magnetic head writing capability provide the recited grain size and Coercivity (Hc) values as representing theoretically "optimum" in unpatterned magnetic recording media.

In view of the fact that presently marketed magnetic recording system technology typically utilizes longitudinally "c-axis" oriented magnetic particle containing materials which demonstrate maximum Coercivities (Hc) on the order of three (3K-Oe) to four (4K-Oe) Kilo-Oersteds, it can be concluded that a magnetic recording material which would provide a minimum grain size of around ten (10) nanometers and a maximum Coercivity (Hc) of approximately twelve (12K-Oe), but which would allow adjustment of maximum Coercivity (Hc) downward by controllable and known fabrication parameters, and which magnetic recording material could be fabricated to demonstrate either longitudinal or perpendicular magnetic particle "c-axis" orientation therewithin, again by control of known fabrication parameters, would provide not only immediate utility, but utility projected into the far foreseeable future when practical fabricated magnetic recording system write head system capabilities approach upper theoretical limitations.

The inventors of the present invention have identified several nanocomposite material containing films with potential for application in extremely high-density magnetic recording materials, including CoPr, CoPt, CoSm, SmFeSiC SmFeAlC and FePt. (See "Nanoscale Design of Films for Extremely High Density Magnetic Recording", Sellmyer, Yu, Thomas, Liu & Kirby, Phys. Low-Dim. Struct., ½155, (1998)).

The present inventors have also observed that various materials demonstrate relaxed viscosity at temperatures of, for instance:

1446 K for $SiO_2$;

820 K for $GeO_2$;

526 K for $B_2O_3$;

186 K for Glycerol;

(see for instance "Dynamics of Strong and Fragile Glass Formers: Differences and Correlation with Low-Temperature Properties", Sokolov et al., Phys. Rev. Lett, Vol. 71, No. 13, p. 2062, (1993)).

The conceptual insight leading to the present invention, was that magnetic recording material systems which combine alternating layers of appropriate thicknesses of:

nanocomposite material containing films; and films of materials which demonstrate relaxed viscosity at desirable anneal temperatures;

might allow fabrication of magnetic recording materials which demonstrate predictable magnetic material grain size, predictable maximum coercivity (Hc) and magnetic particle "c-axis" orientation, (ie. longitudinal or perpendicular to a resulting magnetic recording material film), by a relatively simple multi-layer vacuum deposition, (and subsequent anneal), procedure onto even non-lattice matched substrates.

It is noted at this point that other researchers have reported fabrication of FePt films on lattice matched (001) MgO single crystal substrates using Molecular Beam Epitaxy (MBE) systems. Articles describing this are;

"Direct Formation of Ordered CoPt and FePt Compound Thin Films by Sputtering", Visokay & Sinclair, App. Phys. Lett., 66, (1995);

"Enhanced Magneto-Optical Keer Effect in Spontaneously Ordered FePt Alloys: Quantitative Agreement Between Theory and Experiment", Cebollada et al., Phys. Rev. B, 50 (1994).

"Control of the Axis of Chemical Ordering and Magnetic Anisotropy in Epitaxial FePt Films", Farrow et al., J. App. Phys. 79 (1996).

The films achieved present with perpendicularly oriented "c-axis" orientation. Said approach again, however, requires (MBE) capability and use of lattice matching (001) MgO.

Inventors of the presently disclosed invention have investigated fabrication of longitudinally oriented magnetic recording media with a coercivity of 3000 Oe to 6300 Oe, as described in Patent to Sellmyer et al., U.S. Pat. No. 5,824,409. Said 409 Patent describes production of said a magnetic recording media composed of alternating thin film layers of Platinum (Pt) and an element selected from the group consisting of Iron (Fe) and Cobalt (Co), sequentially deposited onto a substrate. To achieve the final system result an anneal of the deposited materials at 300 to 600 degrees Centigrade was performed.

Previous published results by the present Inventors has documented fabrication and investigation of Co:C; CoPt:C, Fe/Pt; FePt:$SiO_2$ films. Said work is variously described in Scientific Articles:

"Structural and Magnetic Properties of Nanocomposite Co:C Films", Yu, Liu & Sellmyer, J. App. Phys. Vol. 85, No. 8, (Apr. 15, 1999);

"Nanocomposite CoPt:C Films For Extremely High-Density Recording", Yu, Liu, Weller & Sellmyer, App. Phys. Lett., Vol. 75, No. 25, (Dec. 20, 1999);

"Magnetic Viscosity and Switching Volumes of Annealed Fe/Pt Multilayers", Luo, Shan & Sellmyer, J. App. Phys. 79(8), (Apr. 15, 1996);

"Magnetic Properties and Structure of Fe/Pt Thin Films", Luo & Sellmyer, IEEE Transactions on Magnetics, Vol. 31, No. 6, (November 1995); and "Structural and Magnetic Properties of FePt:$SiO_2$ Granular Thin Films", Luo & Sellmyer, App. Phys. Lett., Vol 75, No. 20, (Nov. 15, 1999).

A further paper by present Inventors is titled "Nanostructured Magnetic Films For Extremely High Density Recording", Sellmyer, Yu & Kirby, Nanostructured Mat., Vol. 12, (1999). This paper reports that over twenty years coercivity (Hc) in Co-based recording media has increased for approximately 0.3 K-Oe to approximately a present 3K-Oe and that the most advanced media presently are CoCrPtX alloys, where X represents Ta, Nb etc.

A Search of Patents has identified a Patent to Sellmyer et al., U.S. Pat. No. 5,824,409 which focuses on longitudinal high coercivity recording media comprised of alternating layers of Fe and Pt, without mention of intervening Oxide layers therebetween, however.

A recent U.S. Pat. No. 6,183,606 B1 to Kuo et al., describes FePt-$Si_3N_4$ composite films. This Patent does not claim perpendicular anisotropy, nor does it describe simultaneously obtaining both high coercivity (eg. 8–11 kOe) and small grain size (eg. 8 nm). Said 606 Patent does provide a thin film for magnetic recording media including particles of about 50 nm diameter, 200 nm thickness, high coercivity, plane-parallel easy axis, FePt at 50/50 proportions, and fcc crystal phase going into fct phase during anneal at near 600 degrees Centigrade. However, the matrix in which the FePt particles reside comprises $Si_3N_4$ which is a non-magnetic phase serving the simple role of diluting the magnetism of the material. Other materials are not disclosed to serve as the non-magnetic phase.

A U.S. Pat. No. 5,603,766 to Visokay et al. describes a method for producing uniaxial tetragonal thin films of ternary intermetallic compounds. Preferably the substrate is single crystal, such as MgO or $Al_2O_3$, or an amorphous material such as $SiO_2$, amorphous carbon or glass. A sequence of three metals are deposited with the substrate heated to 450 degrees Centigrade. The first and second metals are selected from the group (CoNi or CoFe or FeNi), and the third metal is Fe or Pt. The thin film formed is a ternary intermetallic compound exhibiting an $Li_0$ crystal structure and uniaxial properties.

A U.S. Pat. No. 5,363,794 to Lairson et al. describes uniaxial thin films formed from multilayers of Fe and Pt on MgO. Annealing at 450 degrees Centigrade is conducted after sputter deposition.

Even in light of existing art, it should be appreciated that films of magnetic materials, (eg. FePt/Oxide or Fe/Pt/Oxide), with up to terabit areal density recording capacity, which are, in preferred practice, produced by relatively simple sequential vacuum deposition and annealing procedures that allow selective control of magnetic material grain size, coercivity and/or magnetic particle longitudinally or perpendicularly oriented "c-axes", would provide utility. With this in mind, it is disclosed that the present invention identifies FePt and/or Fe/Pt based materials, (eg. FePt/$SiO_2$ and FePt/$B_2O_3$, Fe(Co)Pt/$SiO_2$ and Fe(Co)/$B_2O_3$), with FePt/$B_2O_3$ as preferred, and discloses relatively simple fabrication methodology therefore.

DISCLOSURE OF THE INVENTION

References identified in the Background Section of this Specification disclose that it is known that equiatomic FePt alloy films with an (fct) tetragonal Llo structure are characterized by a very high anisotropic energy constant (K1) on the order of $7 \times 10^7$ erg/cc, which makes them very attractive for application in recording media with an areal density of 100 Gbit per square inch and higher. Further, based on thermal stability considerations, it is known that an ultimate optimum grain size in equiatomic FePt alloy films with an (fct) tetragonal Llo structure is on the order of just under 10 nm.

It must be appreciated however, that while theoretically optimum magnetic recording material parameters are known, presently available recording systems can not yet write to media which optimally have, for instance, a Coercivity of about twelve (12) K-Oe. Hence, at least until more optimum write, and read, capability is realized, magnetic media characterized as less than theoretically optimum will continue to find application. It is noted that presently Coercivity (Hc) in typical magnetic media which can be written onto by existing magnetic recording system write heads is on the order of 3–4 K-Oe.

In that light, it becomes apparent that a need exists for magnetic recording media, and specific methodology of its fabrication, which allows predictably and routinely realizing magnetic recording media with intended magnetic material grain size and coercivity (Hc) and magnetic particle "c-axis" orientation. Were such a magnetic recording media and fabrication methodology available it would provide great utility, both immediately and into the foreseeable future. The present invention answers said need in the form of, in the preferred embodiment, identifying multi-layer FePt/Oxide, (where $B_2O_3$ is the preferred oxide), magnetic media, and fabrication methodology therefore based in vacuum deposition and anneal. Briefly, control of FePt or Fe/Pt layer and/or Oxide layer thickness, and/or annealing temperatures and times, during fabrication enables realization of magnetic media with selected, (albeit correlated), grain size and coercivity values, and with longitudinal or perpendicular magnetic particle "c-axis" orientations.

The preferred embodiment of the present invention system then can be recited as being a magnetic media suitable for use in extremely high density recording systems, comprising a plurality of sequentially alternating, FePt and/or Fe/Pt; and Oxide;

layers on a surface of a substrate. What distinguishes said system is that it is characterized by an X-ray diffraction pattern wherein a (111) peak has a magnitude between substantially absent and less than half the magnitude of the larger of present (001) and (002) peaks. A preferred oxide is selected from the group consisting of:

$SiO_2$; and $B_2O_3$;

(with $B_2O_3$ being most preferred), and the order of the substrate and at least one FePt and at least one Oxide layers, is selected from the group consisting of:

substrate-FePt and/or Fe/Pt-Oxide; and substrate-Oxide-FePt and/or Fe/Pt.

Said system can be fabricated by, in any functional order, the steps of:

a. providing a substrate;
b. providing a vacuum deposition system comprising sources of FePt and/or Fe & Pt and an oxide;
c. placing said substrate into said vacuum deposition system;
d. depositing a plurality of sequentially alternating layers, in an order selected from the group consisting of:

FePt/Oxide;

(Fe/Pt)/Oxide

Oxide/(Fe/Pt)

Oxide/FePt;

onto said substrate; and
e. annealing said substrate onto which has been vacuum deposited a plurality of sequentially alternating layers of:

FePt and/or Fe/Pt; and Oxide;

at a temperature and time combination sufficient to result in a system characterized by an X-ray diffraction pattern wherein a (111) peak has a magnitude between substantially absent and less than half the magnitude of the larger of present (001) and (002) peaks.

In the preferred embodiment the preferred oxide is selected from the group consisting of:

$SiO_2$; and $B_2O_3$,

To realize the alternative embodiment, said FePt layer(s) are deposited to be less than about forty Angstroms thick.

A preferred present invention system can be recited as a magnetic media suitable for use in extremely high density recording systems, comprising a plurality of sequentially alternating, FePt and/or Fe/Pt; and $B_2O_3$;

layers on a surface of a substrate wherein said FePt layer(s) are less than forty Angstroms thick, said system being characterized by an X-ray diffraction pattern wherein a (111) peak has a magnitude between substantially absent and less than half the magnitude of the larger of the (001) and (002) peaks. Said system $B_2O_3$ layer is typically selected to be between eight (8) and twelve (12) Angstroms thick and the system presents with a coherence of between ten thousand (10,000) and twelve thousand (12,000) Orsteds.

An important consideration is that the method of fabricating a present invention system does not require providing a substrate which is essentially lattice matched to crystallinity of the resulting magnetic recording material and a suitable substrate, it is noted, is 7059 glass.

An alternative embodiment of a present invention system can be recited as a magnetic media suitable for use in extremely high density recording systems, comprising a plurality of sequentially alternating, FePt and/or Fe/Pt; and $B_2O_3$;

layers on a surface of a substrate wherein said FePt or (Fe/Pt) layer(s) are greater than about forty Angstroms thick, said system being characterized by an X-ray diffraction pattern including (110) and (220) peaks and essentially negligible (111), (001) and (002) peaks which are less than half the larger of the (110) and (220) peaks.

Said alternative embodiment of a present invention system can be fabricated by, in any functional order, the steps of:

a. providing a substrate;
b. providing a vacuum deposition system comprising sources of FePt and/or Fe and Pt and an oxide;
c. placing said substrate into said vacuum deposition system;
d. depositing a plurality of sequentially alternating layers, in an order selected from the group consisting of:

FePt/Oxide;

(Fe/Pt)/Oxide

Oxide/(Fe/Pt)

Oxide/FePt;

onto said substrate; and
e. annealing said substrate onto which has been vacuum deposited a plurality of sequentially alternating layers of:

FePt and/or Fe/Pt; and Oxide;

at a temperature and time combination sufficient to result in a system characterized by an X-ray diffraction pattern including (110) and (220) peaks and essentially negligible (111), (001) and (002) peaks which are less than half the larger of the (110) and (220) peaks, after the anneal procedure.

Said alternative embodiment preferable involves providing an oxide selected from the group consisting of:

$Sio_2$; and $B_2O_3$.

To realize the alternative embodiment, said FePt layer(s) are deposited to be greater than about forty Angstroms thick.

A preferred alternative system embodiment comprises a plurality of sequentially alternating, FePt and/or FePt; and $B_2O_3$;

layers on a surface of a substrate wherein said FePt layer(s) are less than forty Angstroms thick, said system being characterized by an X-ray diffraction pattern including (110) and (220) peaks with essentially negligible (111), (001) and (002) peaks which are less than half the larger of the (110) and (220) peaks, after the anneal procedure after the anneal procedure, and the $B_2O_3$ layer is between eight (8) and twelve (12) Angstroms thick and the system presents with a coherence of between six (6) thousand (6,000) and twelve thousand (12,000) Oersteds.

Again, particularly where $B_2O_3$ is the oxide present, it has been determined that where as-deposited FePt layer(s) are less than about forty (40) Angstroms thick appropriate annealing tends to cause as-deposited films to undergo a phase transition from FePt face-centered-cubic (fcc) to a face-centered-tetragonal (fct) structure which demonstrates (001) and (002) X-ray Diffraction peaks of significant magnitude, with concurrent reduction of the (111) XRD peak. Where as-deposited FePt layer(s) are greater than about forty (40) Angstroms thick appropriate annealing tends to cause as-deposited films to undergo a phase transition from FePt face-centered-cubic (fcc) to a face-centered-tetragonal (fct) structure which demonstrate (110) and (220) peaks and essentially negligible (111), (001) and (002) peaks which are less than half the larger of the (110) and (220) X-ray diffraction peak magnitudes after anneal.

Where $B_2O_3$ is the oxide utilized in a present invention system, it has been found that annealing at 550 degrees Centigrade for 30 minutes cause as-deposited films to undergo a phase transition from FePt or Fe/Pt face-centered-cubic (fcc) to a face-centered-tetragonal (fct) structure.

Where $SiO_2$ is the oxide utilized in a present invention system, it has been found that annealing at between 450 and 650 degrees Centigrade for up to 2 hours causes as-deposited films to undergo a phase transition from FePt face-centered-cubic (fcc) to a face-centered-tetragonal (fct) structure. In addition, rapid thermal annealing (RTA) can be applied, such as wherein temperature is increased at 100 degrees Centigrade per second, then held constant for one second, then cooled over a period of ten seconds.

The methodology of fabricating any present invention system typically involves providing a vacuum deposition system within which is caused to be a base pressure of about $10^{-7}$ Torr therewithin, prior to entry of argon to a pressure of about 5 m-Torr and vacuum sputtering deposition of said alternating layers of FePt and/or Fe/Pt and Oxide.

It is specifically to be understood that while the methodology of fabrication involves deposition of alternating layers of Fe Pt and Oxide, after anneal the present invention system comprises modulated granular composition rather than clear, sharply defined, layers.

The present invention will be better understood by reference to the Detailed Description Section of this Specification, with reference to the accompanying Drawings.

SUMMARY OF THE INVENTION

It is therefore a primary purpose and/or objective of the present invention to teach a system comprising a plurality of sequentially alternating, FePt and/or Fe/Pt; and Oxide;

layers on a surface of a substrate, said system being characterized by an X-ray diffraction pattern wherein a (111) peak has a magnitude between substantially absent and less than half the magnitude of the larger of present (001) and (002) peaks; said system being a magnetic media suitable for use in extremely high density recording systems;

wherein the oxide can be $SiO_2$, but is preferably $B_2O_3$; and wherein the FePt layer(s) thickness is less than about 40 Angstroms.

It is another primary purpose and/or objective of the present invention to teach fabrication of a system comprising a plurality of sequentially alternating, FePt and/or Fe/Pt; and Oxide;

layers on a surface of a substrate, said system being characterized by an X-ray diffraction pattern wherein a (111) peak has a magnitude between substantially absent and less than half the magnitude of the larger of present (001) and (002) peaks; said system being a magnetic media suitable for use in extremely high density recording systems;

by vacuum deposition onto a non-lattice matched substrate, and anneal, procedures.

It is yet another purpose and/or objective of the present invention to teach a system comprising a plurality of sequentially alternating, FePt and/or Fe/Pt; and Oxide;

layers on a surface of a substrate, said system being characterized by an X-ray diffraction pattern including (110) and (220) peaks and essentially negligible (111), (001) and (002) peaks which are less than half the larger of the (110) and (220) peaks after anneal; said system being a magnetic media suitable for use in extremely high density recording systems; and wherein the oxide can be $SiO_2$, but is preferably $B_2O_3$; and wherein the FePt layer(s) thickness is greater than about 40 Angstroms.

It is another purpose and/or objective yet of the present invention to teach fabrication of a system comprising a plurality of sequentially alternating, FePt and/or Fe/Pt; and Oxide;

layers on a surface of a substrate, said system being characterized by an X-ray diffraction pattern including (110) and (220) peak and essentially negligible (111), (001) and (002) peaks which are less than half the larger of the (110) and (220) peaks after anneal; said system being a magnetic media suitable for use in extremely high density recording systems;

by vacuum deposition onto a non-lattice matched substrate, and anneal, procedures.

It is a further purpose and/or objective of the present invention to provide insight to fabrication methodology for tailoring production of magnetic media with desired coercivity, grain size and longitudinal or perpendicular particle orientation.

Other purposes and/or objectives of the present invention will be apparent from a reading of this Specification.

BRIEF DESCRIPTION OF THE DRAWINGS

FIG. 1$a$ shows an XRD (2 $\theta$) plot for a FePt film of 160 Angstroms in depth.

FIG. 1$b$ shows an XRD (2 $\theta$) plot for a multi-layer (FePt/$B_2O_3$)$_5$ film with FePt layers 32 Angstroms in depth, and $B_2O_3$ layers 8 Angstroms in depth.

FIG. 1$c$ shows an XRD (2 $\theta$) plot for a multi-layer (FePt/$B_2O_3$)$_5$ film with FePt layers 32 Angstroms in depth, and $B_2O_3$ layers 12 Angstroms in depth.

FIG. 1$d$ shows an XRD (2 $\theta$) plot for a multi-layer (FePt/$B_2O_3$)$_5$ film with FePt layers 32 Angstroms in depth, and $B_2O_3$ layers 28 Angstroms in depth.

FIG. 2$b$ is a high resolution TEM image of the annealed (FePt 32A/$B_2O_3$ 20 A)$_5$ multi-layer, showing fine FePt single crystals about 4 nm in size were randomly dispersed in the $B_2O_3$ matrix.

FIGS. 3$c$ and 3$d$ show when the $B_2O_3$ layer thickness increases to 12 Angstroms and above, perpendicular anisotropy was observed, thus indicating perpendicular orientation is achieved.

FIG. 4$b$ shows, by extrapolating the magnetization curves, the anisotropy field Hk and anisotropy energy Ku=MsHk/2 were associated with the FePt:$B_2O_3$ films characterized in FIG. 4($a$).

DETAILED DISCLOSURE

While not limiting of the present invention, the preferred embodiment thereof is first described and includes:

1. a system comprised of a plurality of sequentially alternating thin layers of equi-atomic FePt and $B_2O_3$ atop a substrate, in which system the "c-axis" orientation is perpendicular to the plane of the thin film, and
2. the methodology of achieving said system.

The Inventors of the present invention have fabricated preferred embodiment systems comprising FePt/$B_2O_3$ deposited atop 7059 glass substrate surfaces utilizing DC and/or RF-magnetron sputtering. A suitable base pressure in the sputtering chamber prior to initiating sputtering has been demonstrated as $2\times10^{-7}$ Torr and high purity Argon is suitable for use in the sputter deposition, at a pressure of 5 mTorr. FePt targets utilized in actual experimental work by the Inventors were formed by placing Fe-chips, (99.99% purity), onto a Pt target, and 99.9% pure $B_2O_3$ targets directly utilized were obtained from Target Materials Inc. Actual as-deposited films were annealed, in vacuum ambient, at 550 degrees Centigrade for 30 minutes. (FePt 32 A/$B_2O_3$ x A)$_5$ multilayers wherein "x" was varied from 4 to 48 Angstroms were deposited with the 7059 glass substrates held at ambient temperatures. (Note that the subscript ($_5$) after the (FePt 32 A/$B_2O_3$ x A)$_5$, indicates that five bi-layers of FePt/$B_2O_3$ were deposited, and said convention is used throughout this Specification. Also, it has been generally determined that the order of the FePt and $B_2O_3$ depositions is not critical. That is, either the FePt or can be in direct contact with the substrate. Further, the "/" between two entries such as Fe/Pt or FePt/$B_2O_3$ indicates layering. Continuing, the as-deposited films were found to contain a disordered (fcc) FePt phase and were magnetically "soft", with coercivity thereof being less than 100 Oe. After annealing at 550 degrees Centigrade, however, the FePt layer was found to have gone through a transition from the disordered (fcc) phase to an ordered (ftc) structured phase which was found to be predominately characterized by (001), and (002) superlattice peaks in X-ray Diffraction (XRD) scans, as exemplified in FIG. 1c.

Figure 13:
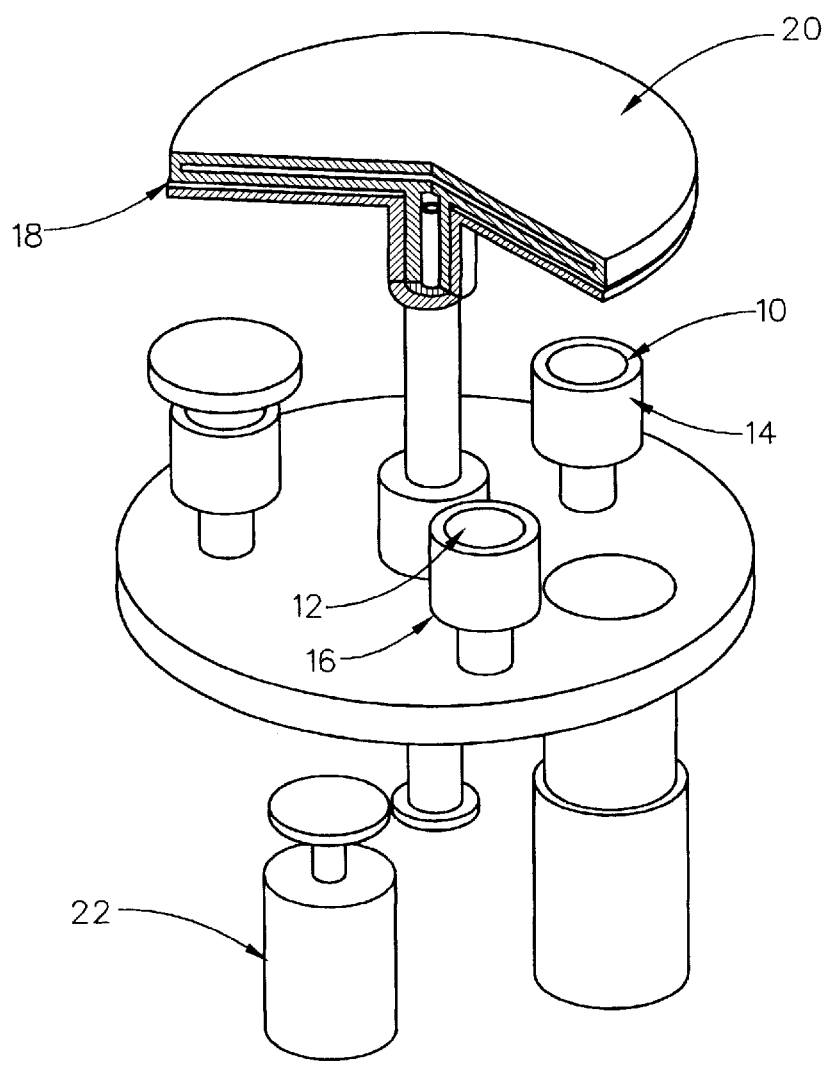
FIG. 13 provides insight to components in a vacuum deposition system as utilized in work presented in this Specification.

Turning now to the Drawings, first, FIG. 13 is included to provide insight to components in a typical vacuum deposition system such as utilized in producing magnetic recording media systems, the results of the testing of which are presented in this Specification. FIG. 13 shows Fe and Pt targets, (10) & (12), (but a single Pt target with Fe bits thereupon was actually utilized in presently reported work). FIG. 13 also shows DC and RF sputtering guns (14) & (16). Substrates (18) are mounted on a rotating table (20) which is controlled by a stepper motor (22).

Continuing, FIGS. 1a–1d show XRD results for various present invention magnetic material systems fabricated by the Inventors. Comparing the results shown in FIG. 1c with results similarly obtained utilizing a FePt single-layer film as presented in FIG. 1a, shows that the intensity of the (111) diffraction peak decreases as $B_2O_3$ layer thickness increases in the FePt/$B_2O_3$ multilayers. For instance, while said (111) peak is still present in FIG. 1b, it is absent in FIGS. 1c and 1d. Where the $B_2O_3$ layer thickness reaches approximately 12 Angstroms, (see FIG. 1c), and for thicknesses thereabove, the (111) peak disappears leaving the (001) and (002) peaks as dominate. This is indicative of the "c-axes" of formed grains being aligned along a normal to the plane of the deposited multi-layer film. The reasons for this "c-axis" orientation is not clear, but presumably involves the growth mechanism of ordered FePt crystallites. Broadening of the (001) and (002) peaks, as shown well in FIGS. 1c and 1d, indicates shorter coherence length normal to the film as the $B_2O_3$ layer thickness increases.

It is also noted that FIG. 1c includes a (001) rocking curve insertion, (obtained by tipping a substrate at both positive and negative angles during data acquisition), and FIG. 1d includes a low angle θ to 2θ scan insertion.

Figure 2A:
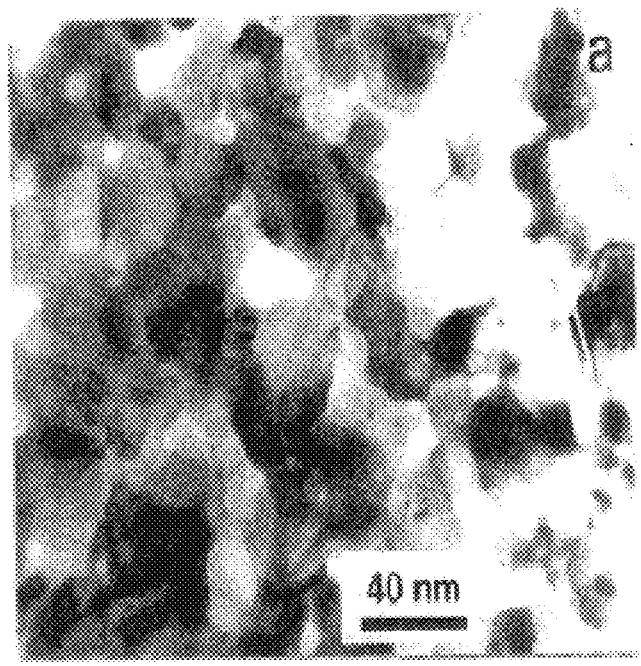
FIG. 2$a$ is a bright field TEM image of the 550 degree Centigrade annealed (FePt 32 A/$B_2O_3$ 12 A)$_5$ multi-layer. The FePt grain size was found in a wide range from 10 to 30 nm.
Figure 2B:
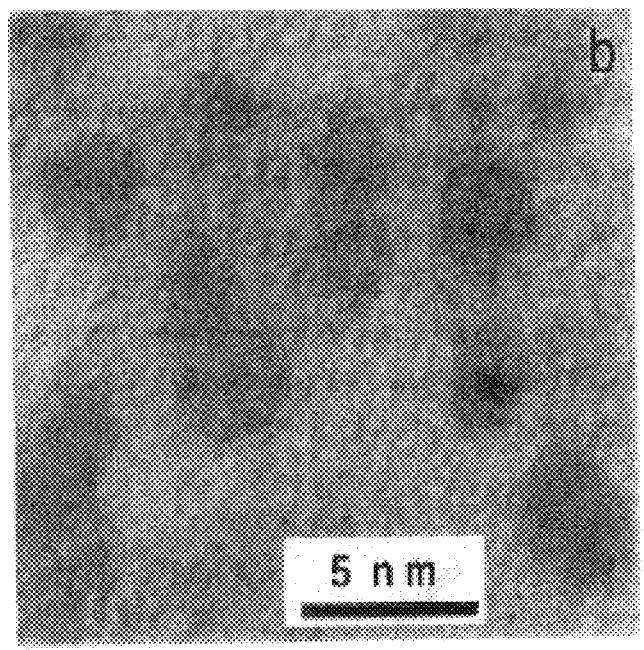

FIGS. 2a and 2b present results of Transmission Electron Microscopy (TEM) investigation of the nanostructure of annealed FePt/$B_2O_3$ multilayers. FIG. 2a is a bright field TEM image of a (FePt 32 A/$B_2O_3$ 12 A)$_5$ multi-layer annealed at 550 degree Centigrade. FePt grain sizes therein were found to vary in a fairly wide range of from 10 to 30 nm. Generally, as the $B_2O_3$ concentration in an annealed FePt/$B_2O_3$ multi-layer is increased, it was found that the grain size decreased. FIG. 2b is a high resolution TEM image of an annealed (FePt 32 A/$B_2O_3$ 20 A)$_5$ multi-layer. It shows that fine FePt single crystals about four (4) nm in size were randomly dispersed in the $B_2O_3$ matrix.

Figure 3A:
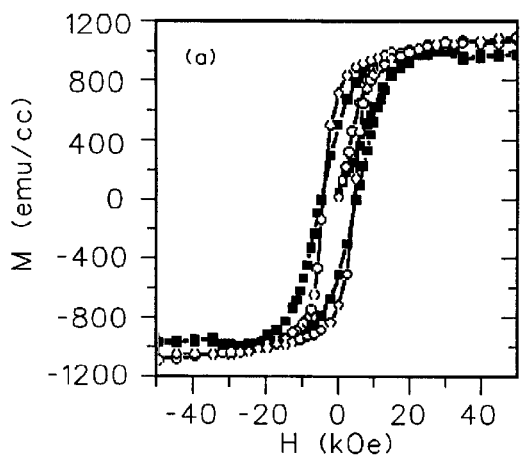
FIGS. 3$a$ and 3$b$ show similar hysteresis loops were obtained in both directions for the FePt single-layer film and the (FePt 32 A/$B_2O_3$ 8 A)$_5$ multi-layer, as shown in which implies the random orientation of the magnetic grains.
Figure 3B:
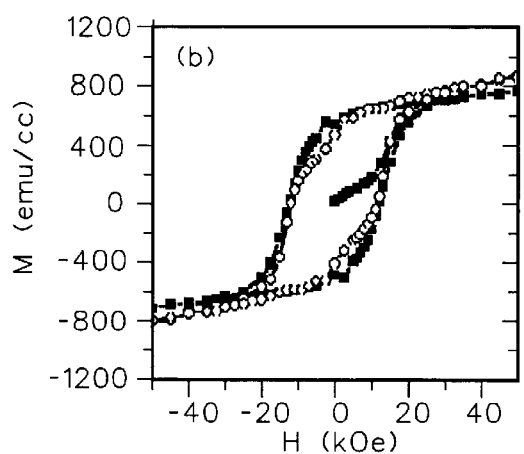
Figure 3C:
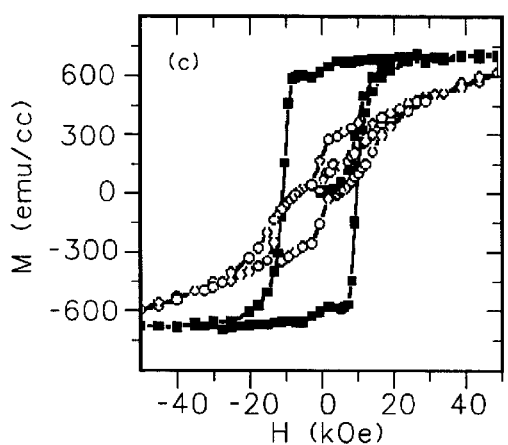
Figure 3D:
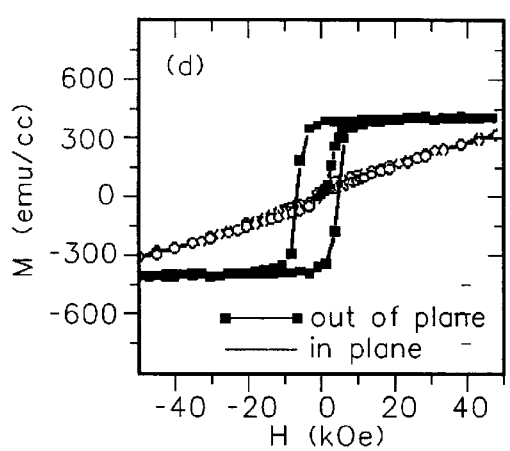

Continuing, FIGS. 3a–3d present hysteresis loops which were measured with applied fields both parallel and perpendicular to the film plane. For the FePt Llo (fct) phase, the "c-axis" is the magnetic easy axis. (See FIG. 16 for insight to the (fct) phase molecular structure). Similar hysteresis loops were obtained in both directions for the FePt single-layer film and the (FePt 32 A/$B_2O_3$ 8 A)$_5$ multi-layer film, the results of which are shown in FIGS. 3a and 3b. Said results imply random orientation of the magnetic grains. When the $B_2O_3$ layer thickness increases to 12 Angstroms and above, however, perpendicular anisotropy was observed as indicated by results shown in FIGS. 3c and 3d, wherein unequal hysteresis curves were obtained for the in and out-of plane cases. Note that, as opposed to results obtained with driving (Hc) applied parallel to the film plane, the hysteresis loops obtained with driving (Hc) applied perpendicular to the plane of the film show a Remanence close to 100% of the saturation magnetization. Also note that the in-plane hysteresis loops diminish as the $B_2O_3$ layer thickness is increased. It should be appreciated that this is consistent with what would be expected based on the XRD measurements.

Figure 4A:
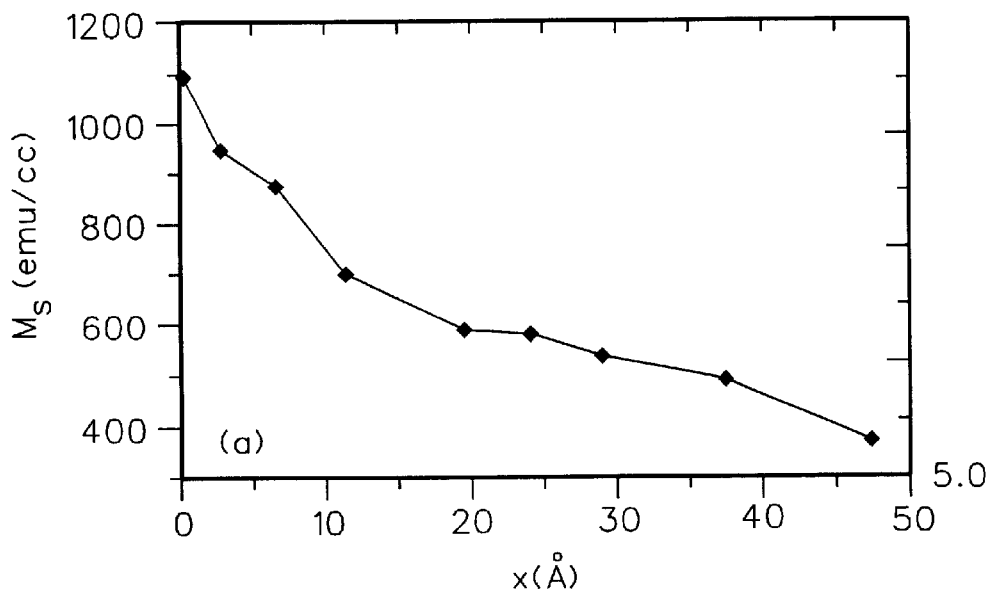
FIG. 4$a$ shows that the saturation magnetization Ms of FePt: $B_2O_3$ films decreases as the $B_2O_3$ layer thickness increases.
Figure 4B:
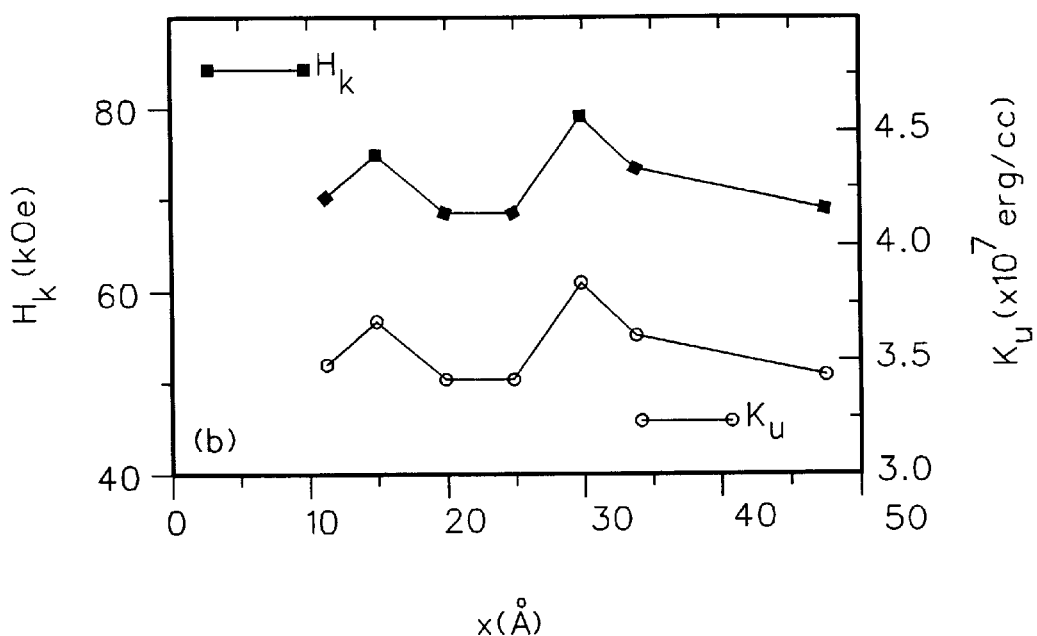

FIG. 4a shows that the saturation magnetization (Ms) of tested films decreases as the $B_2O_3$ layer thickness increases. This is a result of the increase of the $B_2O_3$ concentration. After normalization by the volume fraction of the FePt, the magnetization (Ms) of the FePt phase in the FePt/ $B_2O_3$ nanocomposites is about 1000 emu/cc, slightly less than the (Ms) (approximately 1100 emu/cc) of the FePt single layer film. This is thought to be because of the isolation of the FePt grains by the $B_2O_3$ matrix, resulting in smaller moments for atoms at the grain surface. By extrapolating the magnetization curves, the anisotropy field (Hk) and anisotropy energy (Ku=MsHk/2) were obtained, as shown in FIG. 4b. The (Hk) values are around 70 to 80 K-Oe, which is close to the Hk value of the ($Fe_{45}Pt_{55}$) thin film measured by Li et al. and reported in a paper titled "Use of Rotational Transverse Magnetometry to Measure Anisotropic Energy", Li, J. App. Phys. V. 85, No. 8 p. 5142, (1999). With Ms=1000 emu/cc, the Kg value is about $3.5–4.0 \times 10^7$ erg/cc.

Figure 5:
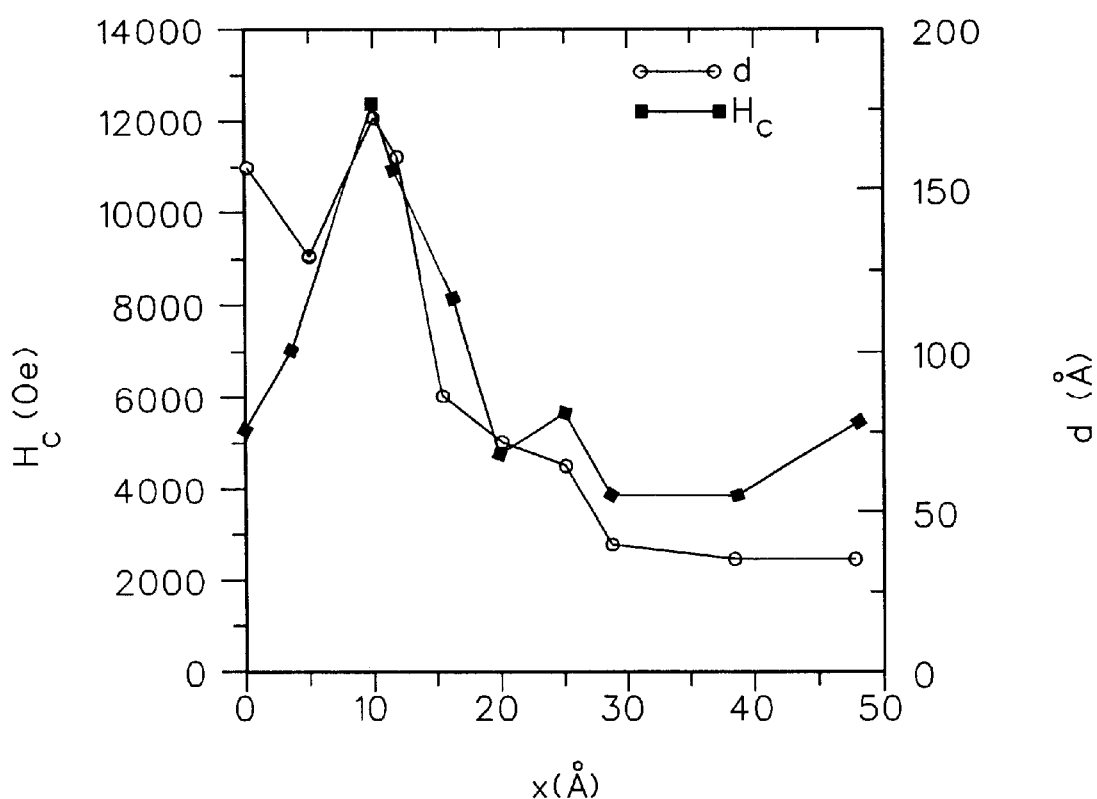
FIG. 5 shows that a small amount (up to 20 vol. %) of $B_2O_3$ in FePt:$B_2O_3$ films sharply increases coercivity from 5.2 k-Oe to 12 K-Oe. At the same time, the grain size (d) only slightly changes.
Figure 6A:
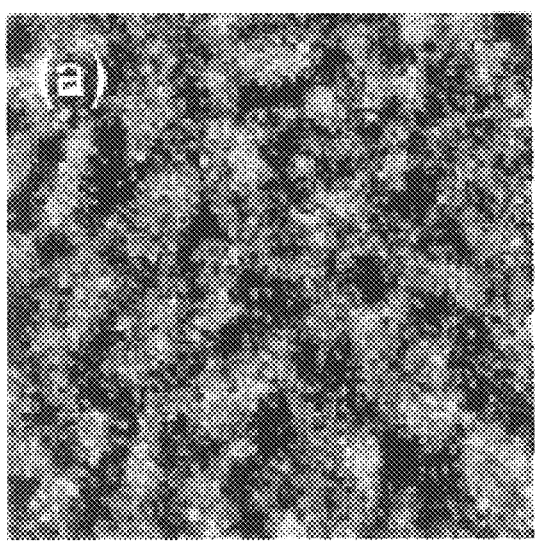
FIGS. 6a, 6b, 6c and 6d show MFM images of the annealed multilayers taken by a MFM tip magnetized along z-axis (ie. the film normal direction), wherein the FePt layer depth is 32 Angstroms, but the $B_2O_3$ layer depths progress as 8, 12, 20 and 28 Angstroms as one progresses from FIG. 6a to FIG. 6d.
Figure 6B:
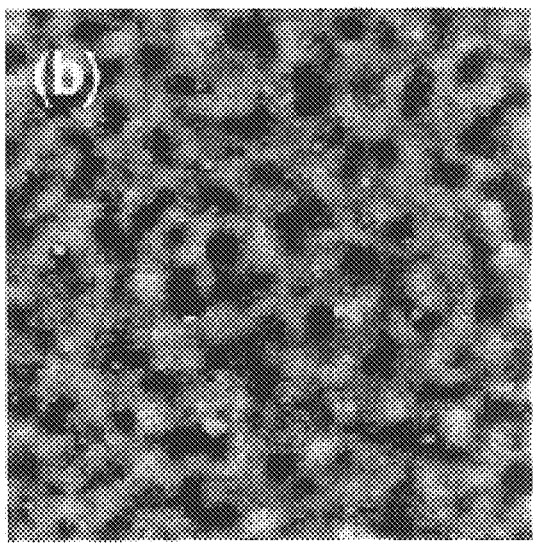
Figure 6C:
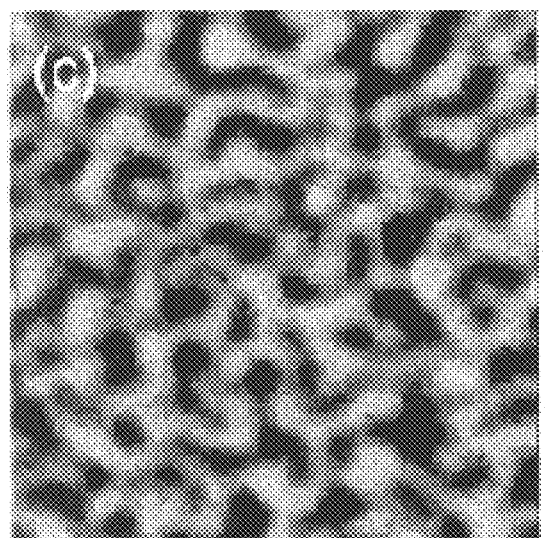
Figure 6D:
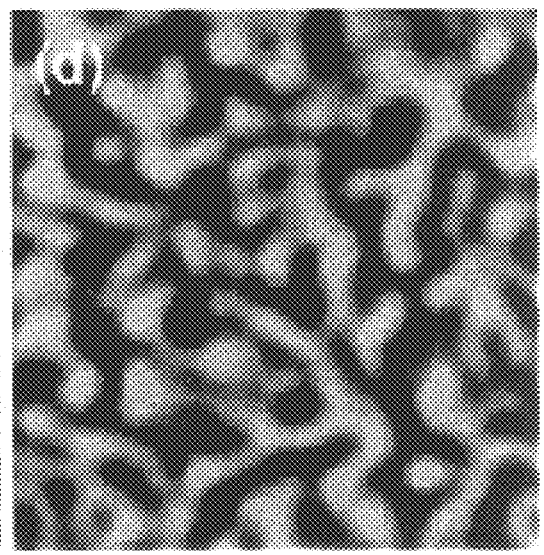

FIG. 5 shows the dependence of grain size (d) and Coercivity (Hc) on the $B_2O_3$ layer thickness. The average grain size (d) was estimated by the Scherrer formula, (as described in "Elements of X-Ray Diffraction", Cullity 2nd ed. Reading, Mass., Addison-Wesley, (1978)), from the width of the (001) diffraction peak. It should be appreciated that the average grain sizes are well below the critical single domain particle size, (approximately 300 nm). Further, since the coercivity is much smaller than the anisotropy field (Hc/Hk<0.2), an incoherent reversal mechanism is suggested. FIG. 5 shows that a small amount, (up to 20 vol. %), of $B_2O_3$ sharply increases Coercivity (Hc) from 5.2 k-Oe to 12 K-Oe, but that at the same time, the grain size (d) is only slightly changed. Therefore, the increase in Coercivity (Hc) might be the result of a decrease of intergrainular exchange coupling and/or an increase of the number of pinning sites when $B_2O_3$ is added. However, further increase of $B_2O_3$, (beyond 20 vol. %), results in a sharp decrease of (Hc). This probably is due to the sharp decrease in grain size. When the $B_2O_3$ layer thickness reaches 28 Angstroms and above, (d) remains a constant value, close to the FePt layer thickness. This is in contrast with the low angle XRD scans which indicate that films retain a layered structure after annealing.

FIGS. 6a, 6b, 6c and 6d show Magnetic Force Microscope (MFM) images of the annealed multilayers taken by a MFM tip magnetized along z-axis (ie. the film normal direction). In all cases the FePt layer depth was 32 Angstroms, but the $B_2O_3$ layer depths progress through 8, 12, 20 and 28 Angstroms as one progresses through results shown in FIGS. 6a to 6d. (Note, all samples were in the thermally demagnetized state). It is to be understood that MFM's image magnetic force and force gradient between the tip and the sample, which are related to the magnetic field or spatial derivatives of the magnetic field from the sample, respectively. Therefore, the MFM is essentially a magnetic charge imaging device, sensitive to the divergence of the magnetization. Hence, samples with sharper magnetization transitions along the z-axis are expected to have MFM images with better contrast. As can be seen from results shown in FIGS. 6a–6d, the image contrast improves as the $B_2O_3$ layer-thickness increases. Because the improvement of the (001) texture as the $B_2O_3$ layer thickness increases, which results in strong perpendicular anisotropy, the magnetic moments are aligned along the film normal direction, resulting in opposite magnetic poles on the film surface, and therefore a sharp image contrast develops. While the magnetic moments were randomly distributed for samples with thin $B_2O_3$ layer, (under 12 Angstrom), poor image contrast was obtained due to weak magnetic stray field and stray field gradient along the z-axis. The exchange coupling length of the magnetic grains, which is related to the transition length in recording media, has been estimated at about 150 nm from the MFM images, much larger than the crystallite size in the films.

To summarize to this point, FePt/ $B_2O_3$ nanocomposite thin films with strong perpendicular anisotropy were successfully fabricated on glass substrates utilizing readily available conventional sputtering deposition and thermal-annealing precesses. Under appropriate conditions these films consist of Llo FePt (fct) particles embedded in the $B_2O_3$ layer. The estimated exchange coupling length of the magnetic grains varies from about 50–150 nm as determined from MFM images. These films have fine grain sizes (<10 nm), applied annealing temperature adjustable coercivities (4–12 K-Oe), and perpendicular magnetic anisotropy, thus making them significant candidates for present and future application in extremely high areal density magnetic recording media above 100 Gbits per square inch.

It is noted for emphasis that while the above focused on preparation of thin films $FePtB_2O_3$ nanocomposite thin films with preferred strong perpendicular anisotropy, (ie. the (fct) "c-axis" is oriented perpendicular to the plane of the FePt/$B_2O_3$), film it has been found that where the thickness of the FePt deposited layer is above approximately 40 Angstroms, the resulting $FePt/B_2O_3$ nanocomposite thin films favor presenting with longitudinal anisotropy.

Next, while $B_2O_3$ is the preferred material, $FePt/SiO_2$ nanocomposite thin films with strong perpendicular anisotropy were also fabricated. Said films consist of high-anisotropy face-centered-tetragonal (fct) Llo phase FePt particles embedded in a $SiO_2$ matrix. Much as in the case of the $FePt/B_2O_3$ nanocomposite thin films, grain size and Coercivity (Hc) were found to be highly dependent on annealing temperature and $SiO_2$ concentrations.

Figure 7A:
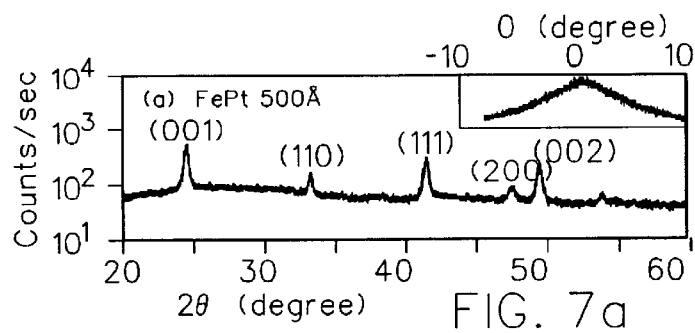
FIGS. 7a–7e shows XRD results for FePt and FePt/$SiO_2$ films.
Figure 7B:
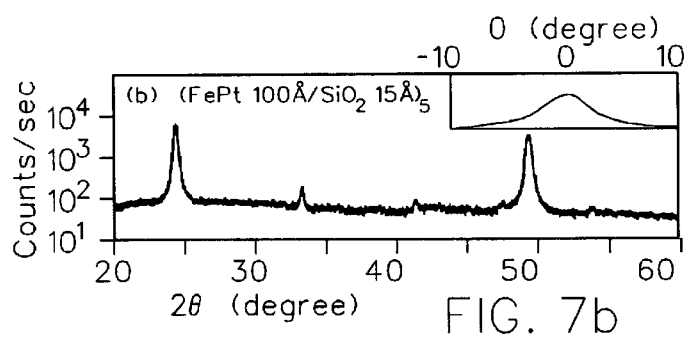
Figure 7C:
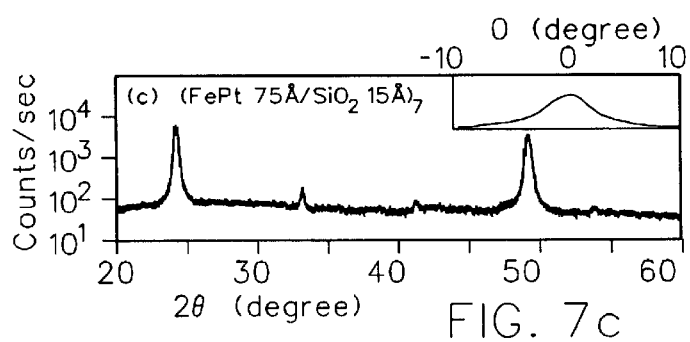
Figure 7D:
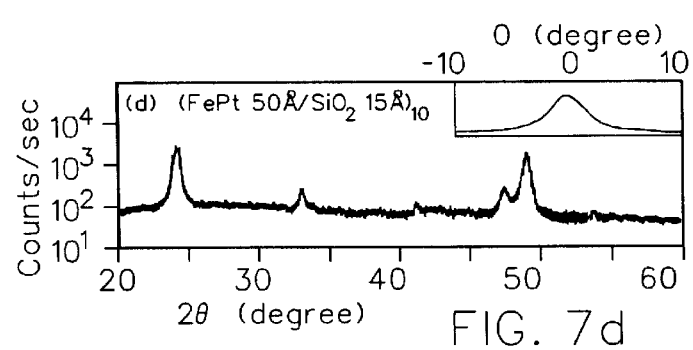
Figure 7E:
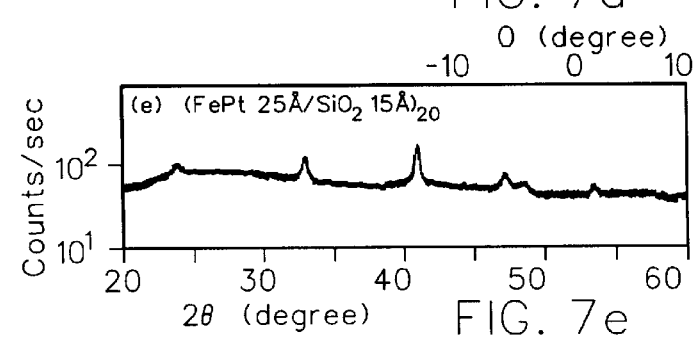

FIGS. 7a–7e shows XRD results for FePt and $FePt/SiO_2$ films. FIG. 7a shows XRD results for a 500 Angstrom FePt film, while FIGS. 7b–7e show results for $FePt/SiO_2$ films wherein the $SiO_2$ layer thickness is constant at 15 Angstroms, but wherein the FePt layer thickness decreases from 100 to 75 to 50 to 25 Angstroms, and that the number of deposited $FePt/SiO_2$ layers were respectively 5, 7, 10 and 20 as one progresses from FIGS. 7b to 7e. Note the relative magnitudes of the (111), (001) and (002) peaks. While not exactly like the results shown in FIGS. 1a–1d, similarity is evident. That is, by sequentially depositing appropriate thicknesses of FePt and $SiO_2$, and utilizing appropriate annealing procedures, high-anisotropy tetragonal Llo FePt particle containing films can be achieved. It is also to be noted that FIGS. 7a–7d contain inserts of (001) rocking curves.

Figure 8A:
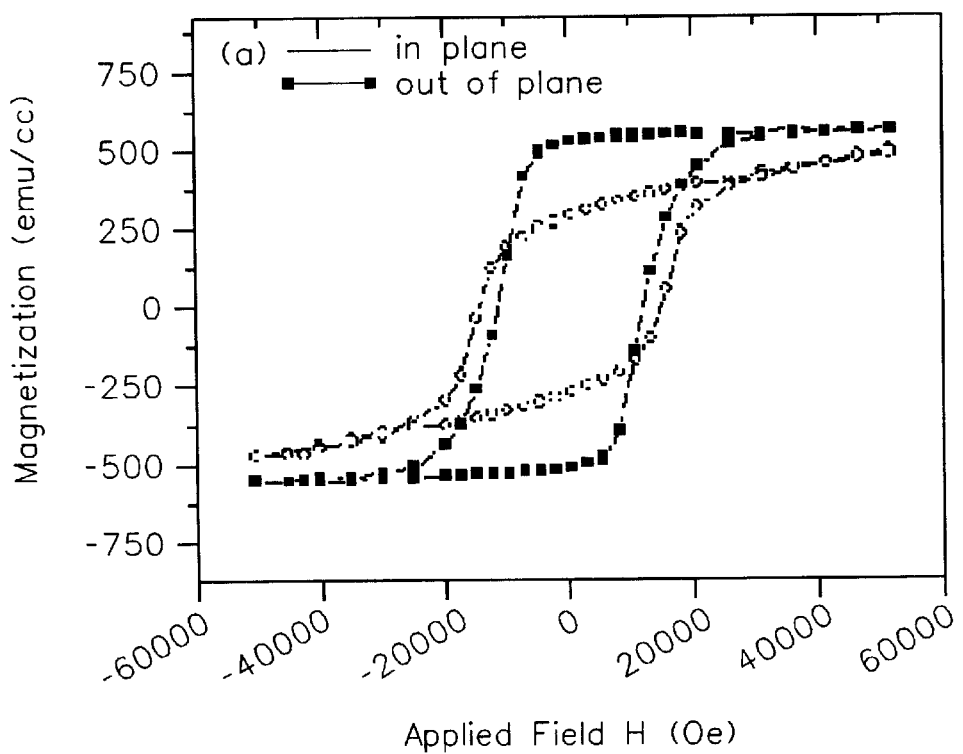
FIGS. 8a and 8b show hysteresis loops for (FePt 100 A/$SiO_2$ 15 A)$_5$ systems annealed at 650 degrees Centigrade for 2 hours, and at 550 degrees centigrade for 30 minutes, respectively.
Figure 8B:
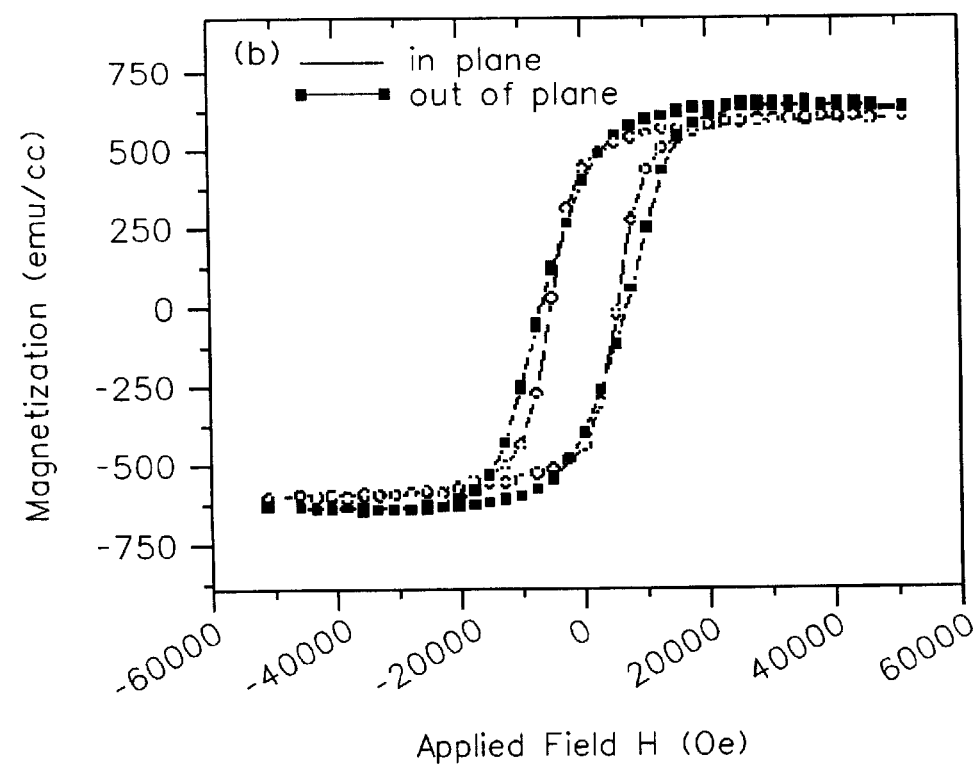

FIGS. 8a and 8b show hysteresis loops for (FePt 100 A/$SiO_2$ 15 A)$_5$ systems annealed at 650 degrees Centigrade for 2 hours, and at 550 degrees centigrade for 30 minutes, respectively. Note the relative equivalence of the in and out-of plane loops in FIG. 8b, and the difference in and out-of plane loops in FIG. 8a.

Figure 9A:
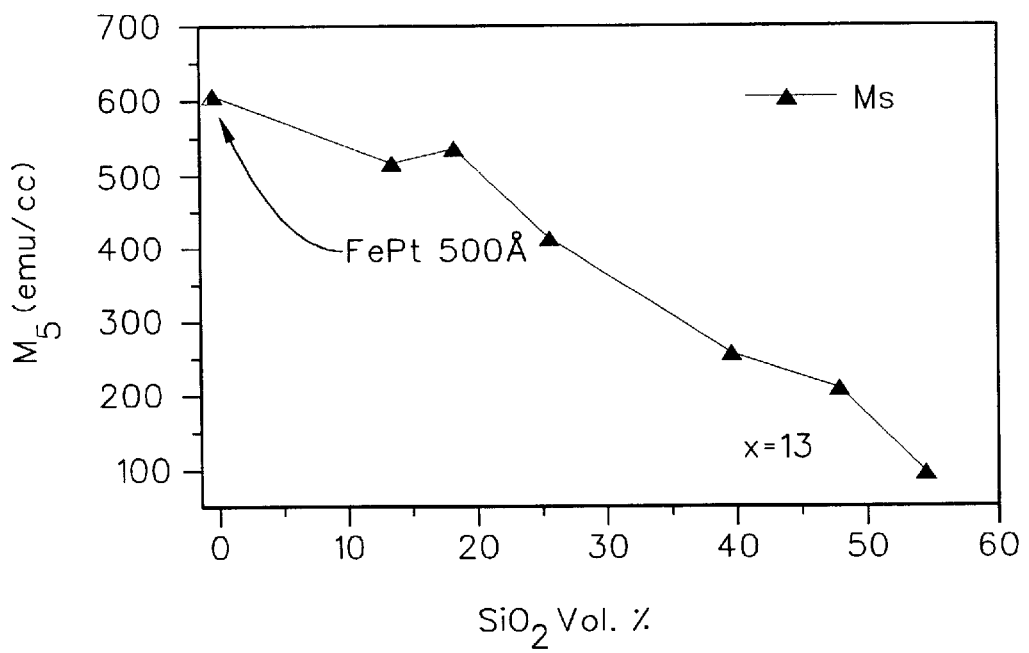
FIGS. 9a and 9b show Magnetization (Ms) and Coercivity (Hc) as a function of $SiO_2$ Vol %.
Figure 9B:
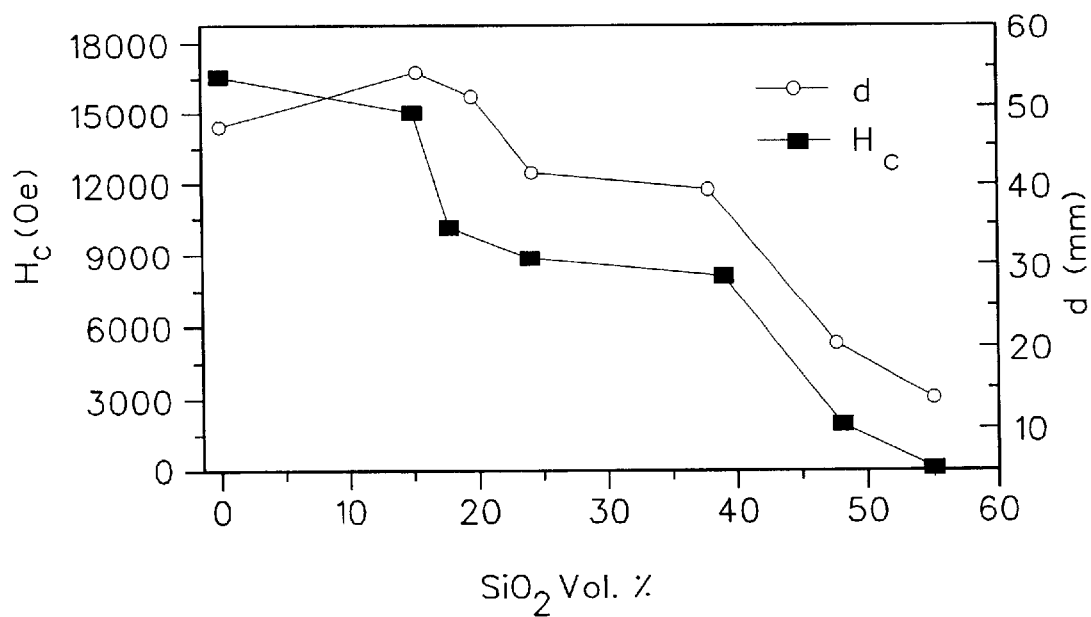

FIGS. 9a and 9b show Magnetization (Ms) and Coercivity (Hc) as a function of $SiO_2$ Vol %.

Figure 10:
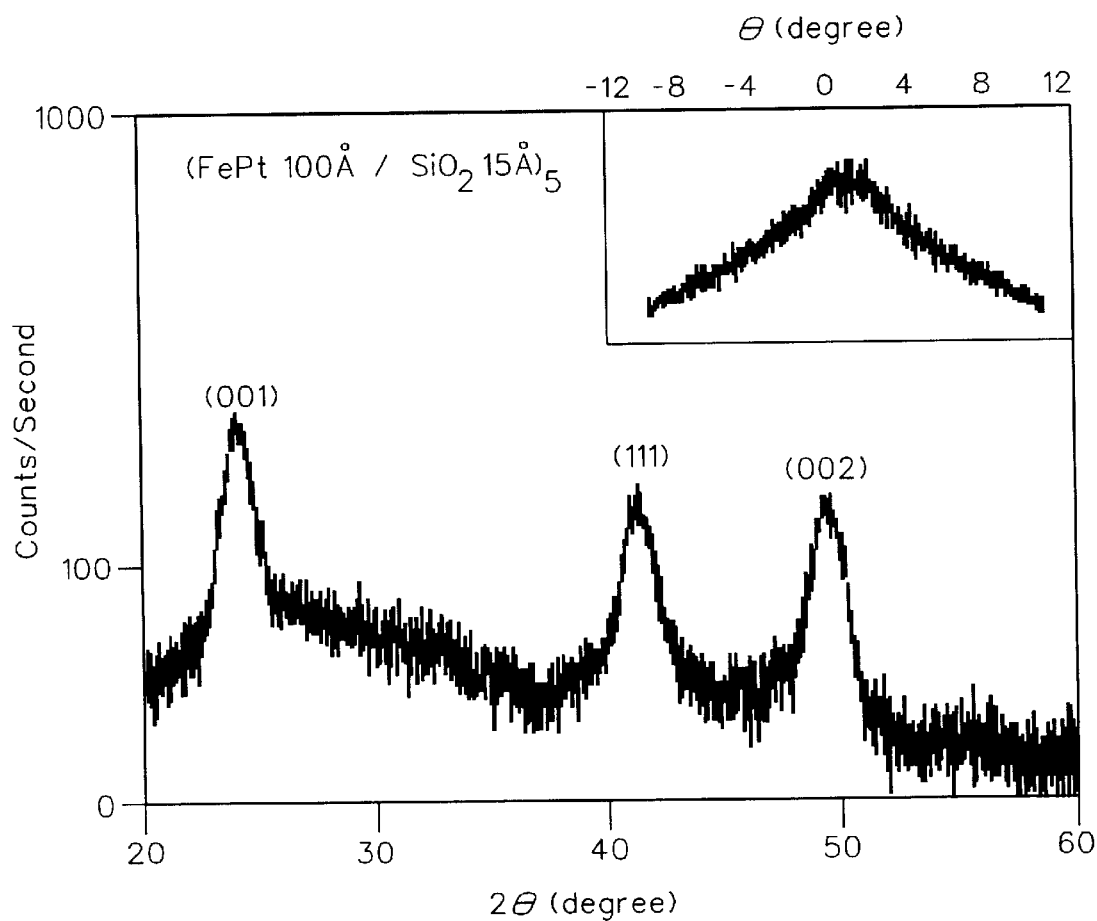
FIG. 10 shows an XRD plot of the (FePt 100 A/$SiO_2$ 15 A) system of FIG. 8b.

FIG. 10 shows an XRD plot of the (FePt 100 A/$SiO_2$ 15 A) system of FIG. 8b.

Figure 11A:
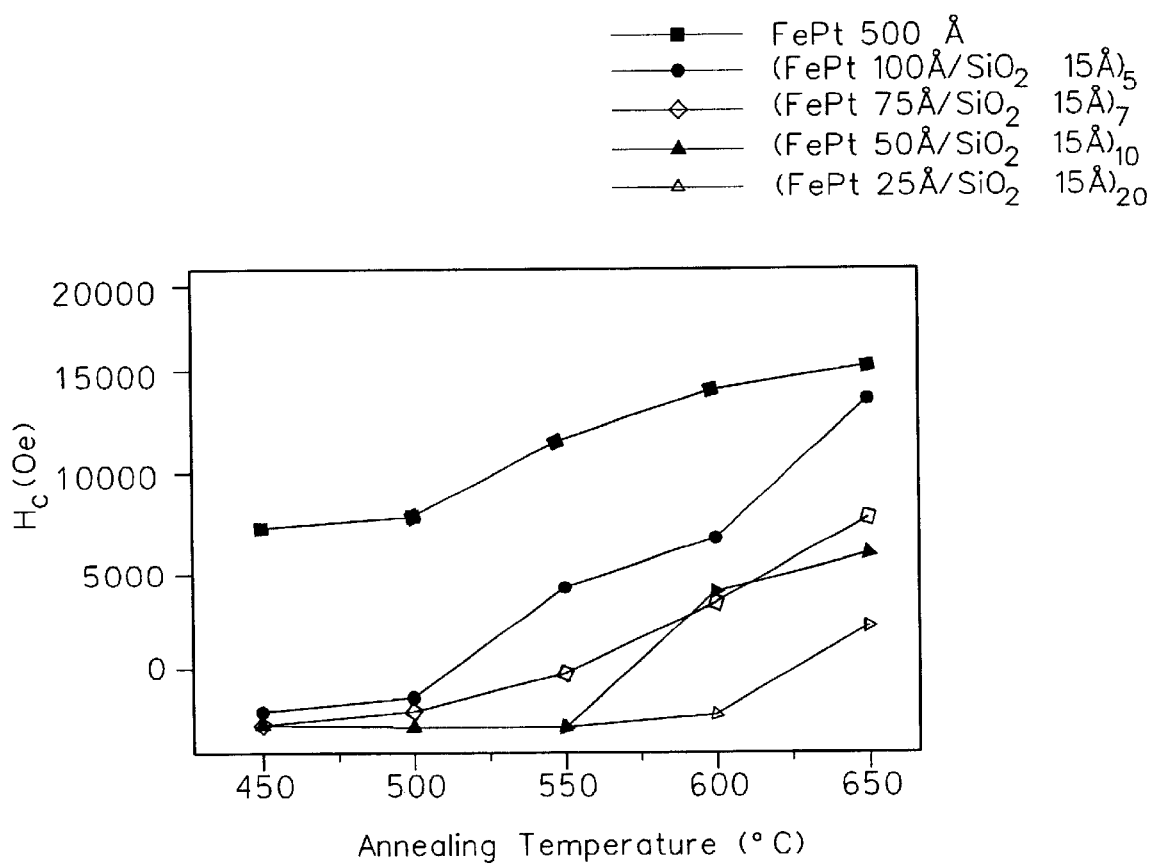
FIGS. 11a and 11b show the effects of annealing temperature on grain size (d) and Coercivity (Hc).
Figure 11B:
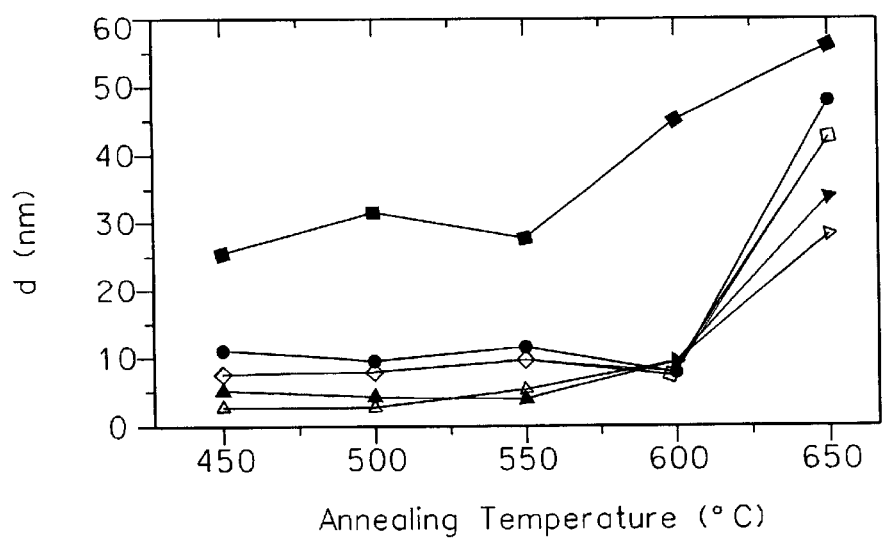

FIGS. 11a and 11b show the effects of annealing temperature on grain size (d) and Coercivity (Hc) where $SiO_2$ is the oxide layer. The annealing time was thirty minutes in each sample monitored. Note that both (Hc) and (d) increase with anneal temperature. It is further noted at this time that where $B_2O_3$ is the oxide, as shown in FIG. 5 (Hc) decreases with increased depth of said $B_2O_3$ layer(s). Insight to how fabrication procedures can be tailored to provide magnetic recording materials with desired Coercivity is provided by said FIGS. 5, 11a and 11b.

Figure 12:
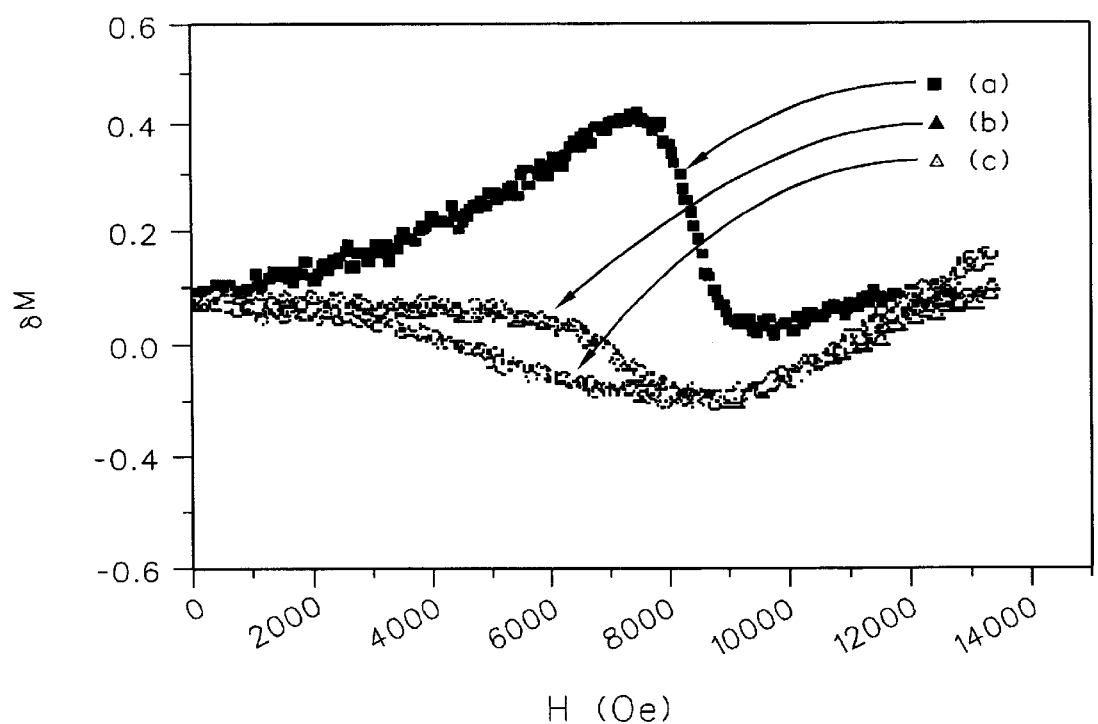
FIG. 12 shows δM plots for a 50 nm FePt single layer film annealed at 450 degrees Centigrade; for (FePt 50 A/$SiO_2$ 15 A)$_{10}$ and (FePt 75 A/$SiO_2$ 15 A)$_7$ films annealed at 650 degrees Centigrade for 30 minutes.

FIG. 12 shows δM plots for a 50 nm FePt single layer film annealed at 450 degrees Centigrade; for (FePt 50 A/$SiO_2$ 15 A)$_{10}$ and (FePt 75 A/$SiO_2$ 15 A)$_7$ films annealed at 650 degrees Centigrade for 30 minutes.

Figure 16:
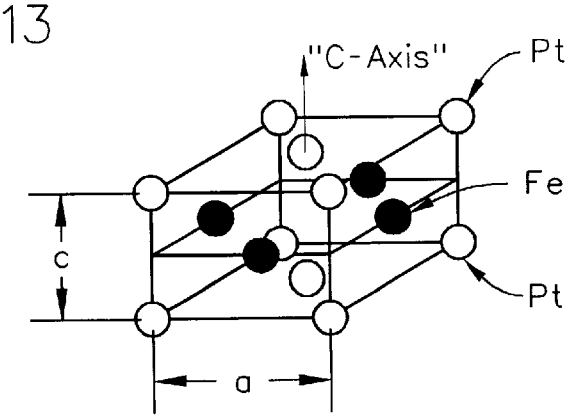
FIG. 16 shows a face-centered-tetragonal (fct) structure with the "c-axis" indicated.
Figure 14A:
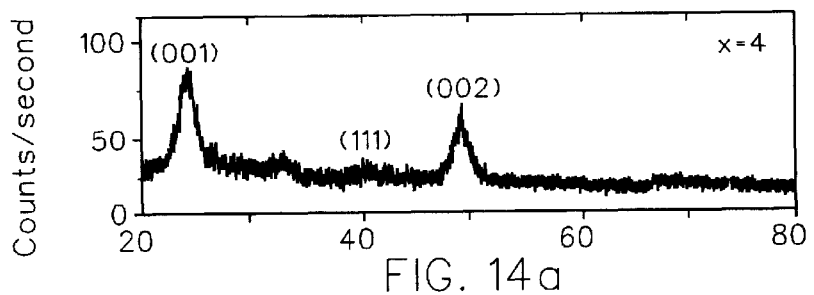
FIGS. 14a–14e show (Fe 5 A/Pt X A)$_2$/$B_2O_3$ 35 A)$_{10}$. XRD plots for X=4, 4.5, 5.5, 6 and 7, showing perpendicular "c-axis" indicating significant (001) and (002) peaks.
Figure 14B:
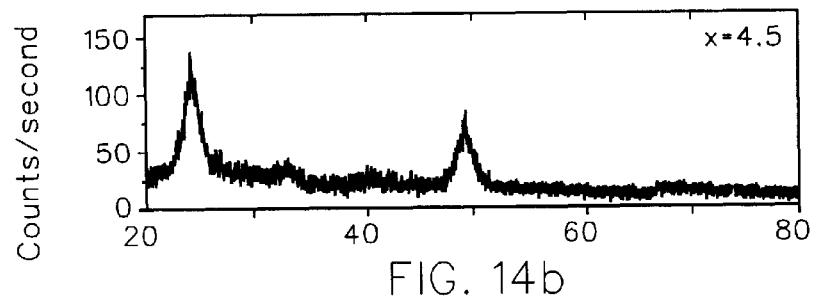
Figure 14C:
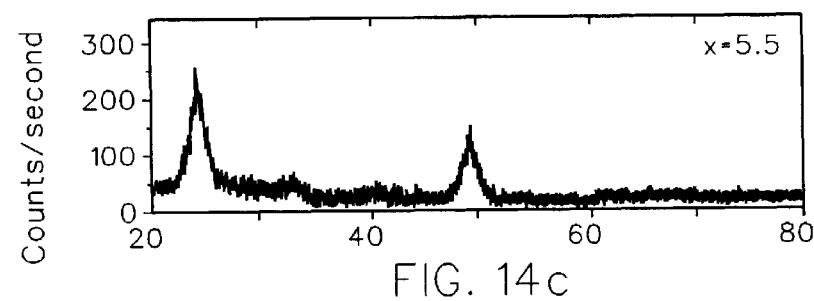
Figure 14D:
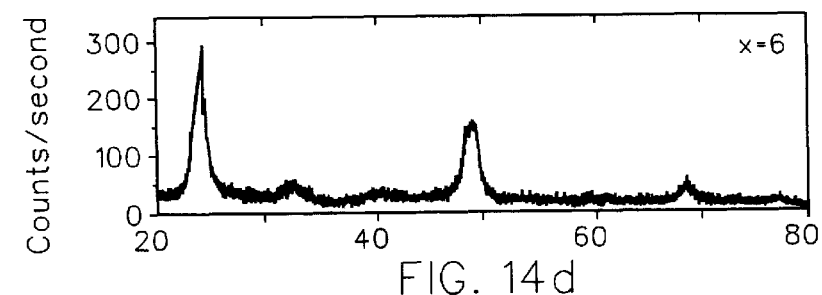
Figure 14E:
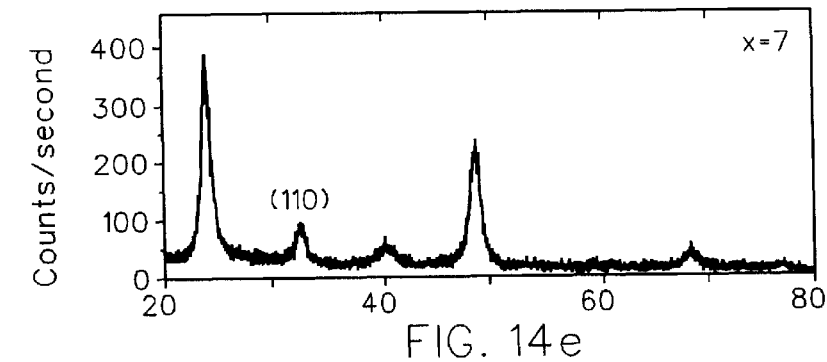
Figure 15A:
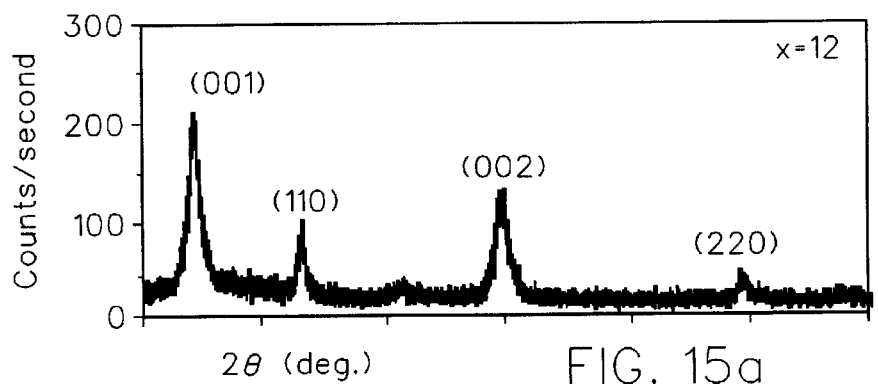
FIGS. 15a–15d show (Fe 10 A/Pt 11 A)$_2$/$B_2O_3$ X A)$_5$. XRD plots for X=12, 18, 24 and 30, showing in-plane "c-axis" indicating significant (110) and (220) peaks.
Figure 15B:
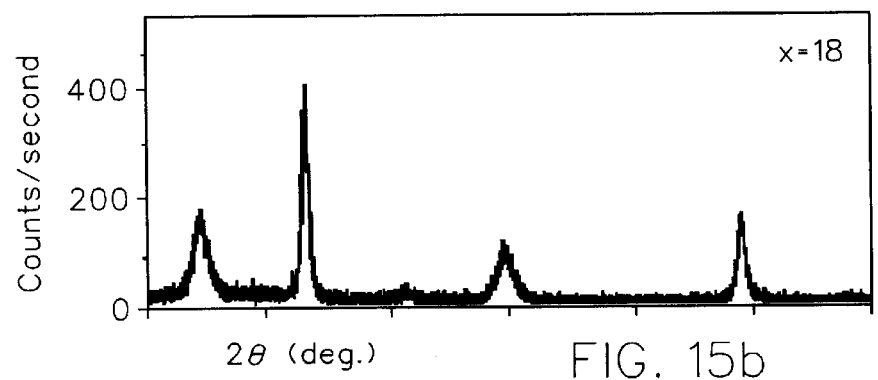
Figure 15C:
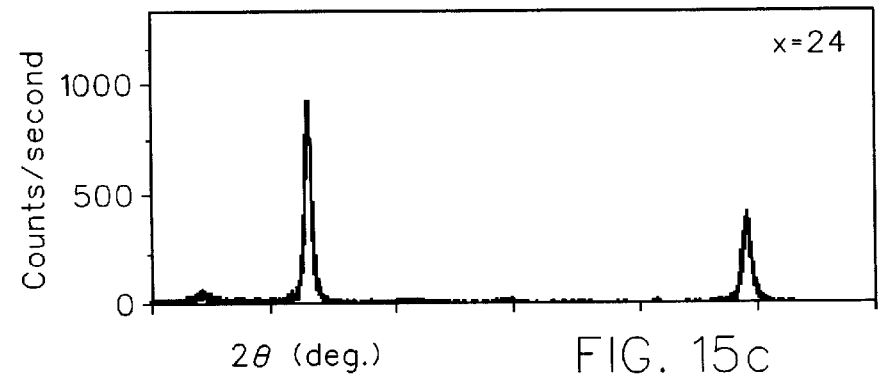
Figure 15D:
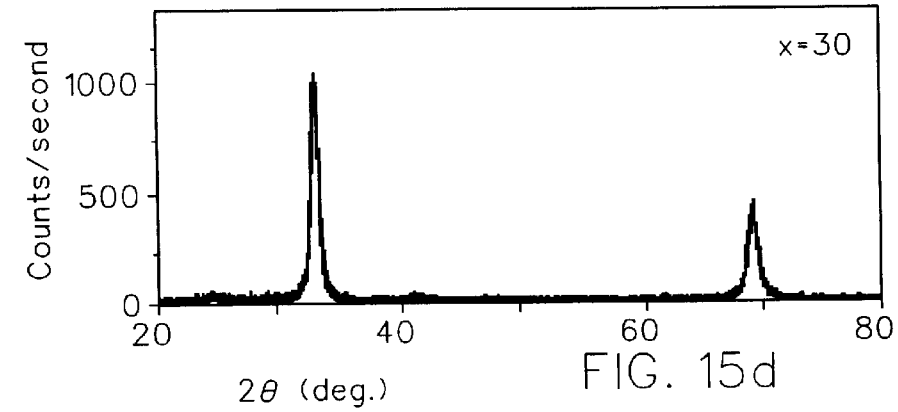

FIG. 13, as discussed earlier, presents insight to components in a typical vacuum deposition system such as utilized in producing magnetic recording media systems, and FIG. 16 shows, for general reference a face-centered-tetragonal (fct) structure with the "c-axis" indicated.

FIGS. 14a–14d show (Fe 5 A/Pt X A)$_2$/$B_2O_3$ 35 A)$_{10}$. XRD plots for X=4, 4.5, 5.5, 6, and 7 showing significant (001) and (002) peaks. This indicates perpendicular "c-axis" orientation. These plots are included to indicate the effect of layering Fe and Pt as well as layering the resulting Fe/Pt with oxide. Note that the maximum (Fe 5 A/Pt X A)$_2$ layer depth is approximately 24 Angstroms.

FIGS. 15a–15d show (Fe 10 A/Pt 11 A)$_2$/$B_2O_3$ X A)$_5$. XRD plots for X=12, 18, 24 and 30, showing significant (110) and (220) peaks. This indicates in-plane "c-axis" orientation, particularly where X is 18 or greater. These plots are included to indicate the effect of layering Fe and Pt as well as layering the resulting Fe/Pt with oxide. Note that the (Fe 10 A/Pt 11 A)2 layer depth is about 42 Angstroms.

Again, FIG. 16 shows insight to the (fct) phase molecular structure.

It is to be understood that while sputter deposition of FePt and Oxide layers is preferred, use of any functionally equivalent vacuum deposition, (such as evaporation), is within the scope of the present invention as claimed.

It is also clarified that a "/" indicates layers, (eg. Fe/Pt indicates an Fe layer and a Pt layer are deposited, and FePt/$B_2O_3$ indicates a layer of FePt and a layer of $B_2O_3$ are deposited. Where a "/" is not present, (eg. FePt) it indicates that the elements Fe and Pt are continuously present in a single layer).

It is noted that the present invention system fabrication procedure involves the sequential depositing of specific layers of Fe, Pt and Oxide, but that a subsequent anneal causes said "layers" to form a system which, while still described as "having layers", tends to be become "granular-composition-modulated". That is the anneal causes a partial "merging" of the layers. While the claims use terminology such as "comprising a plurality of sequentially alternating, FePt and/or Fe/Pt; and Oxide;

layers", said terminology is to be interpreted in the light of identifying a "granular-composition-modulated" system after performance of anneal.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

We claim:

1. A system, comprising a plurality of sequentially alternating,

FePt and/or Fe/Pt; and Oxide;

layers on a surface of a substrate, said system being characterized by an X-ray diffraction pattern wherein a (111) peak has a magnitude between substantially absent and less than half the magnitude of the larger of present (001) and (002) peaks; said system being a magnetic media suitable for use in extremely high density recording systems.

2. A system as in claim 1 in which the oxide is selected from the group consisting of:

$SiO_2$; and $B_2O_3$.

3. A system as in claim 1 in which the order of the substrate and at least one FePt or Fe/Pt and at least one Oxide layers, is selected from the group consisting of:

substrate-FePt and/or Fe/Pt-Oxide; and substrate-Oxide-FePt and/or Fe/Pt.

4. A system comprising a plurality of sequentially alternating,

FePt and/or Fe/Pt; and Oxide;

layers on a surface of a substrate, said system being characterized by an X-ray diffraction pattern wherein a (111) peak has a magnitude between substantially absent and less than half the magnitude of the larger of present (001) and (002) peaks; said system being a magnetic media suitable for use in extremely high density recording systems and the result of the fabrication procedure comprising, in any functional order, the steps of:

a. providing a substrate;

b. providing a vacuum deposition system comprising sources of FePt and/or Fe & Pt and an oxide;

c. placing said substrate into said vacuum deposition system;

d. depositing a plurality of sequentially alternating layers, in an order selected from the group consisting of:

FePt and/or Fe/Pt-oxide; and

Oxide-FePt and/or Fe/Pt;

onto said substrate; and e. annealing said substrate onto which has been vacuum deposited a plurality of sequentially alternating layers of:

FePt and/or Fe/Pt; and oxide;

at a temperature and time combination sufficient to result in a system characterized by an X-ray diffraction pattern wherein a (111) peak has a magnitude between substantially absent and less than half the magnitude of the larger of present (001) and (002) peaks.

5. A system as in claim 4 wherein the step of providing a vacuum deposition system comprising sources of FePt and/ or Fe/Pt and an oxide involves providing an oxide selected from the group consisting of:

SiO$_2$; and B$_2$O$_3$.

6. A system comprising a plurality of sequentially alternating,

FePt and/or Fe/Pt; and Oxide;

layers on a surface of a substrate, said system being characterized by an X-ray diffraction pattern including significant (110) and (220) peaks and essentially negligible (111), (001) and (002) peaks, the magnitudes of which are less than half the larger of the magnitude of the (110) and (220) peaks; said system being a magnetic media suitable for use in extremely high density recording systems.

7. A system as in claim 6 in which the oxide is selected from the group consisting of:

SiO$_2$; and B$_2$O$_3$.

8. A system as in claim 6 in which the order of the substrate and at least one FePt or Fe/Pt and at least one Oxide layers, is selected from the group consisting of:

substrate-FePt and/or Fe/Pt-Oxide; and substrate-Oxide-FePt and/or Fe/Pt.

9. A system comprising a plurality of sequentially alternating,

FePt and/or Fe/Pt; and Oxide;

layers on a surface of a substrate, said system being characterized by an X-ray diffraction pattern including significant (110) and (220) peaks and essentially negligible (111), (001) and (002) peaks, the magnitudes of which are less than half the magnitude of the larger of the (110) and (220) peaks; said system being a magnetic media suitable for use in extremely high density recording systems and the result of the fabrication procedure comprising, in any functional order, the steps of:
  a. providing a substrate;
  b. providing a vacuum deposition system comprising sources of FePt and/or Fe & Pt and an oxide;
  c. placing said substrate into said vacuum deposition system;
  d. depositing a plurality of sequentially alternating layers, in an order selected from the group consisting of:

FePt and/or Fe/Pt-Oxide; and Oxide-FePt and/or Fe/Pt;

onto said substrate; and
  e. annealing said substrate onto which has been vacuum deposited a plurality of sequentially alternating layers of:

FePt and/or Fe/Pt; and Oxide;

at a temperature and time combination sufficient to result in a system characterized by an X-ray diffraction pattern including (110) and (220) peaks and essentially negligible (111), (001) and (002) peaks, the magnitudes of which are less than half the magnitude of the larger of the (110) and (220) peaks, after the anneal procedure.

10. A system as in claim 9 wherein the step of providing a vacuum deposition system comprising sources of FePt and an oxide involves providing an oxide selected from the group consisting of:

SiO$_2$; and B$_2$O$_3$.

11. A system comprising a plurality of sequentially alternating,

FePt and/or Fe/Pt; and B$_2$O$_3$;

layers on a surface of a substrate, said system being characterized by an X-ray diffraction pattern including significant (110) and (220) peaks and essentially negligible (111), (001) and (002) peaks, the magnitudes of which are less than half the larger of the magnitude of the (110) and (220) peaks; said system being a magnetic media suitable for use in extremely high density recording systems.

12. A system as in claim 11 in which the order of the substrate and at least one FePt or Fe/Pt and at least one B$_2$O$_3$ layers, is selected from the group consisting of:

substrate-FePt and/or Fe/Pt-B$_2$O$_3$; and substrate-B$_2$O$_3$-FePt and/or Fe/Pt.

13. A system comprising a plurality of sequentially alternating,

FePt and/or Fe/Pt; and B$_2$O$_3$;

layers on a surface of a substrate, said system being characterized by an X-ray diffraction pattern including significant (110) and (220) peaks and essentially negligible (111), (001) and (002) peaks, the magnitudes of which are less than half the magnitude of the larger of the (110) and (220) peaks; said system being a magnetic media suitable for use in extremely high density recording systems and the result of the fabrication procedure comprising, in any functional order, the steps of:
  a. providing a substrate;
  b. providing a vacuum deposition system comprising sources of FePt and/or Fe & Pt and B$_2$O$_3$;
  c. placing said substrate into said vacuum deposition system;
  d. depositing a plurality of sequentially alternating layers, in an order selected from the group consisting of:

FePt and/or Fe/Pt-B$_2$O$_3$; and

B$_2$O$_3$-FePt and/or Fe/Pt;

onto said substrate; and
  e. annealing said substrate onto which has been vacuum deposited a plurality of sequentially alternating layers of:

FePt and/or Fe/Pt; and B$_2$O$_3$;

at a temperature and time combination sufficient to result in a system characterized by an x-ray diffraction pattern including (110) and (220) peaks and essentially negligible (111), (001) and (002) peaks, the magnitudes of which are less than half the magnitude of the larger of the (110) and (220) peaks, after the anneal procedure.

14. A system comprising a plurality of sequentially alternating,

FePt and/or Fe/Pt; and B$_2$O$_3$;

layers on a surface of a substrate wherein said FePt layer(s) are forty or less Angstroms thick, said system being characterized by an X-ray diffraction pattern wherein a (111) peak has a magnitude between substantially absent and less than half the magnitude of the larger of present (001) and (002) peaks, said system being a magnetic media suitable for use in extremely high density recording systems.

15. A system as in claim 14, in which the $B_2O_3$ layer is between eight (8) and twelve (12) Angstroms thick and the system presents with a coercivity of between ten thousand (10,000) and twelve thousand (12,000) Oersteds.

16. A system comprising a plurality of sequentially alternating,

FePt and/or Fe/Pt; and $B_2O_3$;

layers on a surface of a substrate wherein said FePt layer(s) are forty or greater Angstroms thick, said system being characterized by an X-ray diffraction pattern including (110), (220) peaks and essentially insignificant (111), (001) and (002) peaks, the magnitudes of which are less than half the magnitude of the larger of the (110) and (220) peaks after the anneal procedure.

17. A system as in claim 16, in which each $B_2O_3$ layer is between eight (8) and twelve (12) Angstroms thick and the system presents with a coercivity of between six thousand (6,000) and twelve thousand (12,000) Oersteds.

18. A system presenting with coercivity of between six thousand (6,000) and twelve thousand (12,000) Oersteds, comprising a plurality of sequentially alternating, FePt and/or Fe/Pt; and $B_2O_3$;

layers on a surface of a substrate, said system being characterized by an X-ray diffraction pattern wherein a (111) peak has a magnitude between substantially absent and less than half the magnitude of the larger of present (001) and (002) peaks; said system being a magnetic media suitable for use in extremely high density recording systems.

19. A system as in claim 18 in which the order of the substrate and at least one FePt or Fe/Pt and at least one $B_2O_3$ layers, is selected from the group consisting of:

substrate-FePt and/or Fe/Pt-$B_2O_3$; and substrate-$B_2O_3$-FePt and/or Fe/Pt.

20. A system presenting with coercivity of between six thousand (6,000) and twelve thousand (12,000) Oersteds comprising a plurality of sequentially alternating, FePt and/or Fe/Pt; and $B_2O_3$;

layers on a surface of a substrate, said system being characterized by an X-ray diffraction pattern wherein a (111) peak has a magnitude between substantially absent and less than half the magnitude of the larger of present (001) and (002) peaks; said system being a magnetic media suitable for use in extremely high density recording systems and the result of the fabrication procedure comprising, in any functional order, the steps of:

a. providing a substrate;

b. providing a vacuum deposition system comprising sources of FePt and/or Fe & Pt and an $B_2O_3$;

c. placing said substrate into said vacuum deposition system;

d. depositing a plurality of sequentially alternating layers, in an order selected from the group consisting of:

FePt and/or Fe/Pt-$B_2O_3$; and $B_2O_3$-FePt and/or Fe/Pt;

onto said substrate; and e. annealing said substrate onto which has been vacuum deposited a plurality of sequentially alternating layers of:

FePt and/or Fe/Pt; and $B_2O_3$;

at a temperature and time combination sufficient to result in a system characterized by an X-ray diffraction pattern wherein a (111) peak has a magnitude between substantially absent and less than half the magnitude of the larger of present (001) and (002) peaks.

* * * * *

UNITED STATES PATENT AND TRADEMARK OFFICE
CERTIFICATE OF CORRECTION

| | | |
|---|---|---|
| PATENT NO. | : 6,555,252 B2 | Page 1 of 1 |
| APPLICATION NO. | : 09/803769 | |
| DATED | : April 29, 2003 | |
| INVENTOR(S) | : Sellmyer et al. | |

It is certified that error appears in the above-identified patent and that said Letters Patent is hereby corrected as shown below:

Column 1 at line 10 insert the following phrase, --This invention was made with government support under grant DE-FG03-98ER48703 awarded by the United States Department of Energy. The government has certain rights in the invention.--

Signed and Sealed this

Nineteenth Day of February, 2008

JON W. DUDAS
*Director of the United States Patent and Trademark Office*